United States Patent
Hendrickson et al.

(10) Patent No.: US 10,018,091 B2
(45) Date of Patent: Jul. 10, 2018

(54) EXHAUST SYSTEM

(71) Applicant: Ford Global Technologies, LLC, Dearborn, MI (US)

(72) Inventors: Cory Scott Hendrickson, Ann Arbor, MI (US); Michiel J. Van Nieuwstadt, Ann Arbor, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/354,191

(22) Filed: Nov. 17, 2016

(65) Prior Publication Data
US 2018/0135488 A1    May 17, 2018

(51) Int. Cl.
    *F01N 3/00*     (2006.01)
    *F01N 3/20*     (2006.01)
    *F01N 3/10*     (2006.01)

(52) U.S. Cl.
    CPC ............ *F01N 3/208* (2013.01); *F01N 3/105* (2013.01); *F01N 2610/02* (2013.01)

(58) Field of Classification Search
    USPC ................ 60/274, 286, 295, 297, 301, 303
    See application file for complete search history.

(56) References Cited

U.S. PATENT DOCUMENTS

| | | |
|---|---|---|
| 6,192,675 B1 | 2/2001 | Hirota et al. |
| 6,823,660 B2 | 11/2004 | Minami |
| 8,240,194 B2 | 8/2012 | Dobson et al. |
| 8,273,315 B2 | 9/2012 | Kim et al. |
| 8,601,796 B2 | 12/2013 | Hinz et al. |
| 2009/0000280 A1* | 1/2009 | Ichikawa ................ F01N 3/208 60/286 |
| 2010/0115918 A1* | 5/2010 | Sawada .................. B01D 53/30 60/276 |
| 2011/0083424 A1 | 4/2011 | Wang et al. |
| 2015/0052878 A1* | 2/2015 | Qi .......................... F01N 3/2066 60/277 |
| 2015/0128566 A1* | 5/2015 | Osumi ............... B01D 53/9418 60/274 |
| 2015/0167526 A1 | 6/2015 | Henry et al. |
| 2015/0322838 A1* | 11/2015 | Qi ............................. F01N 9/00 60/276 |
| 2015/0361857 A1* | 12/2015 | Matsuo ................... F01N 11/00 60/277 |

FOREIGN PATENT DOCUMENTS

| DE | 102008000092 A1 | 8/2008 |
|---|---|---|
| DE | 102012211703 A1 | 1/2014 |

* cited by examiner

*Primary Examiner* — Binh Q Tran
(74) *Attorney, Agent, or Firm* — Julia Voutyras; McCoy Russell LLP

(57) ABSTRACT

Methods and systems are provided for SCR devices cascaded along an exhaust passage. In one example, a method may include adjusting a reductant injection pressure based on a temperature of one or more of the SCR devices.

18 Claims, 8 Drawing Sheets

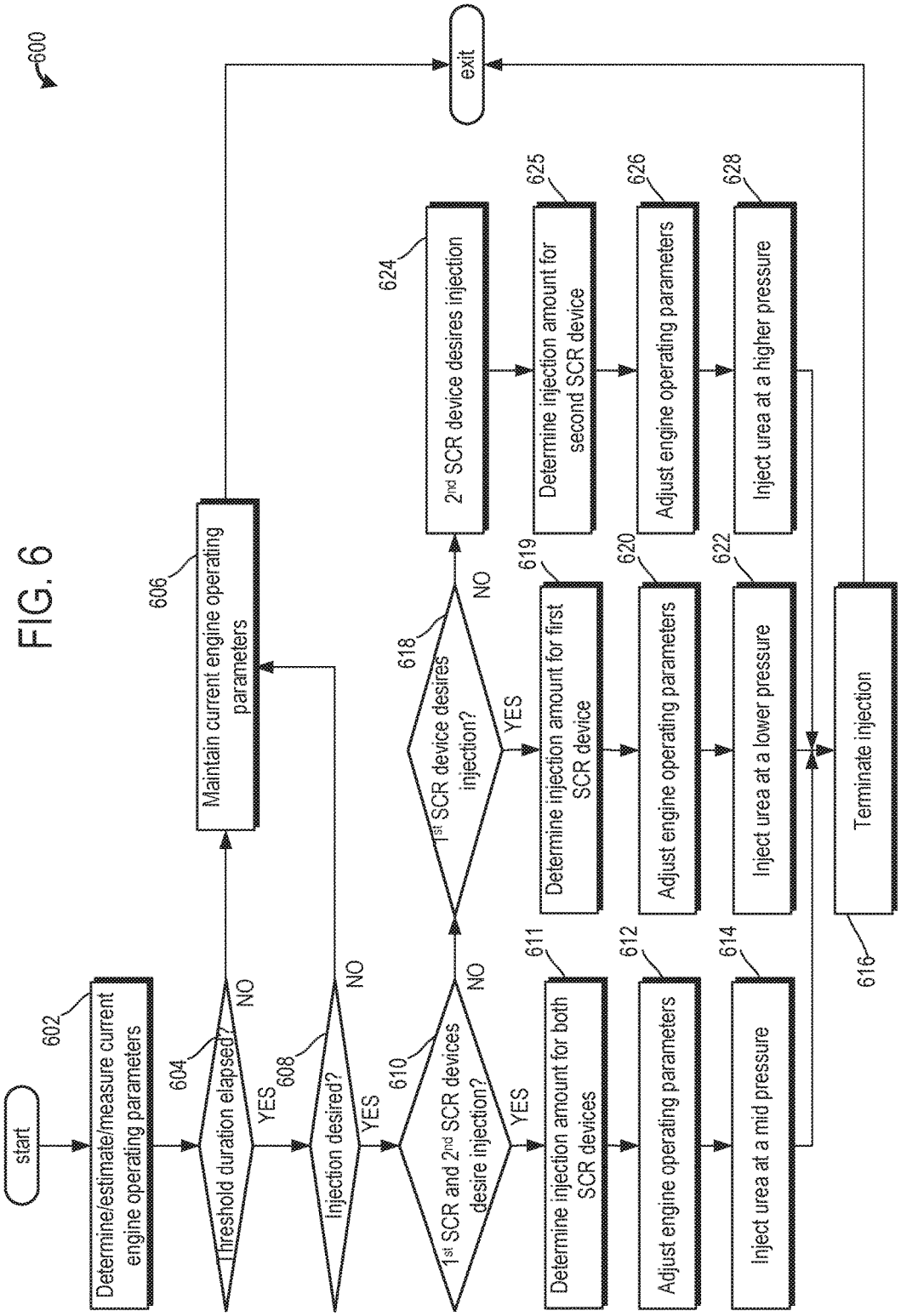

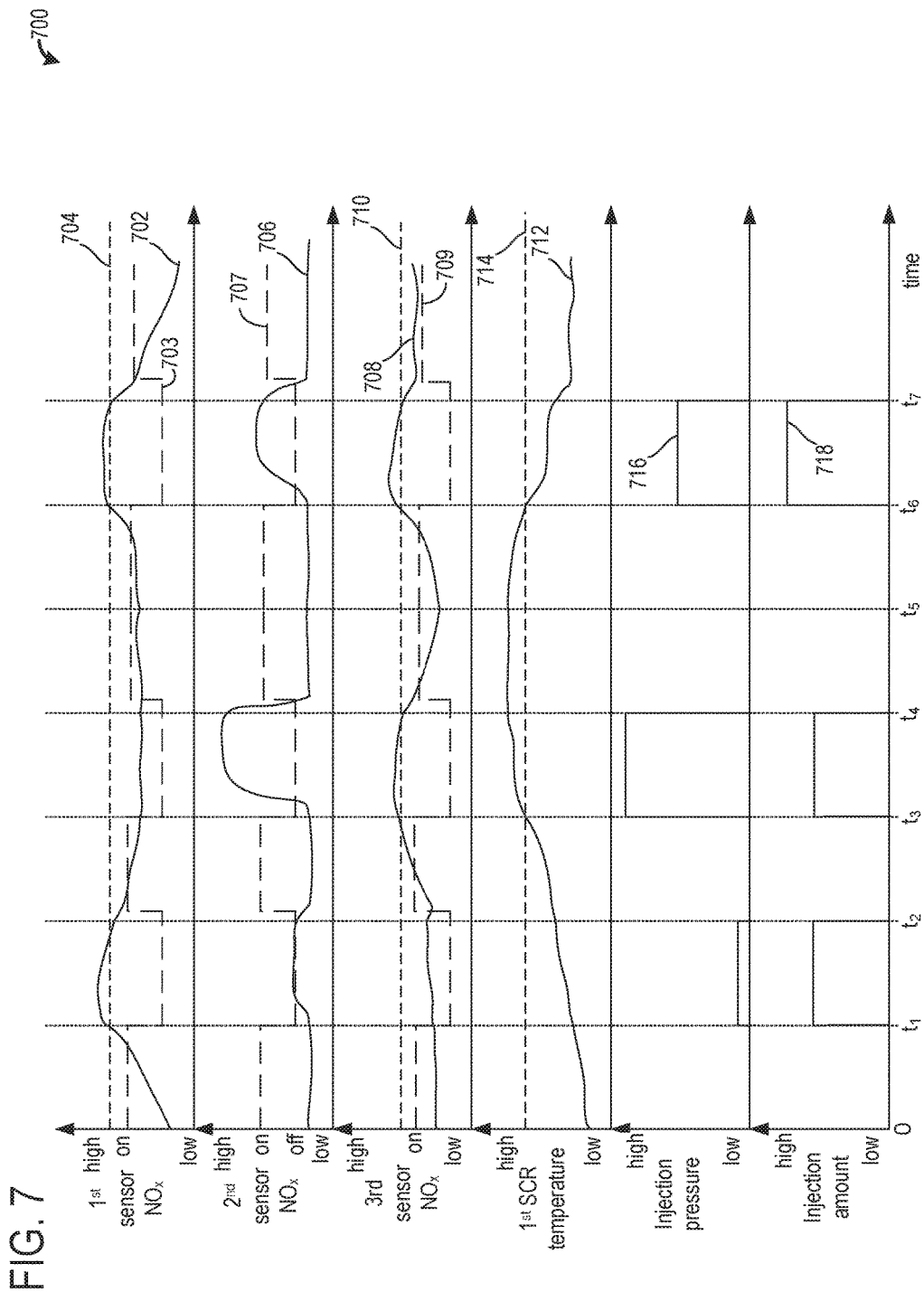

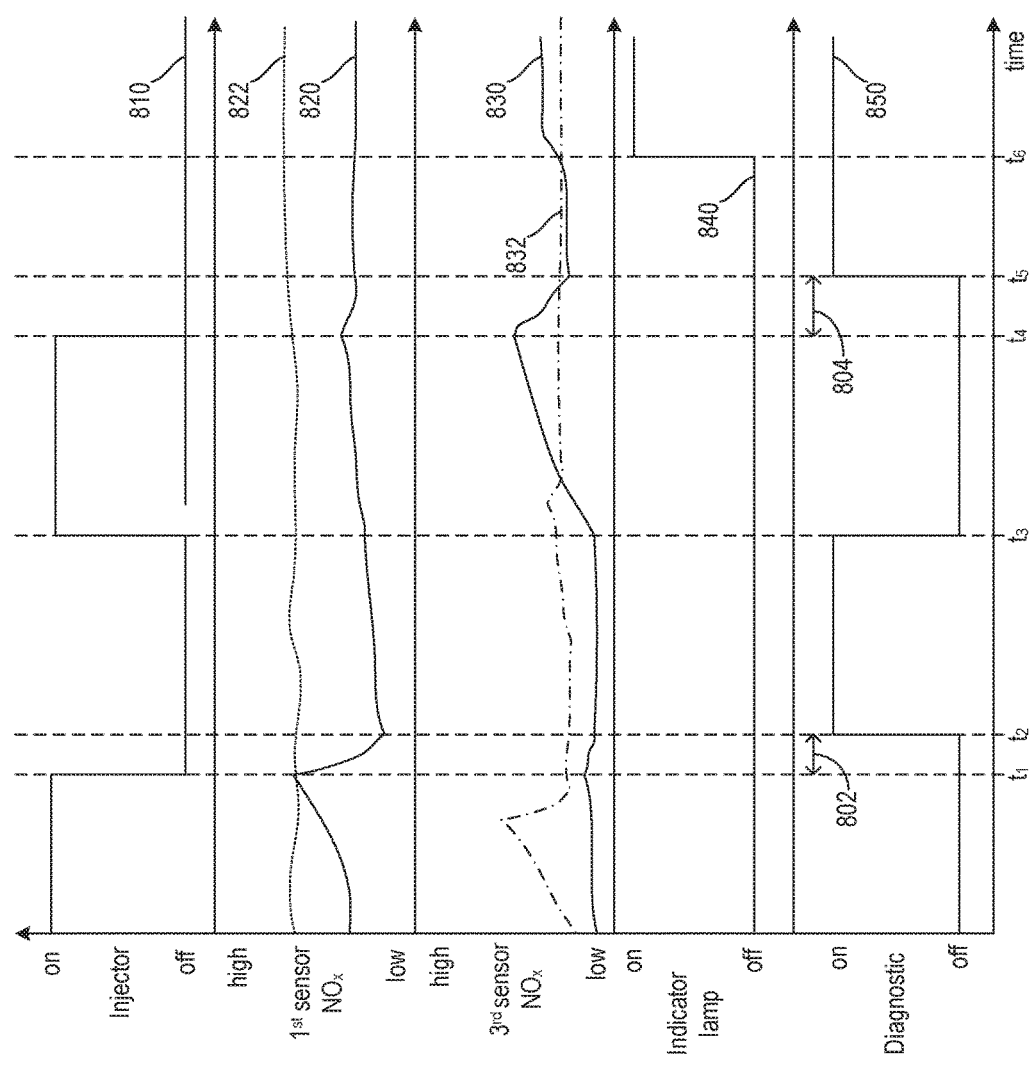

EXHAUST SYSTEM

FIELD

The present description relates generally to an exhaust system having a first SCR device and a second SCR device.

BACKGROUND/SUMMARY

One technology for after-treatment of engine exhaust utilizes selective catalytic reduction (SCR), which facilitate certain chemical reactions to occur between $NO_x$ in the exhaust and ammonia ($NH_3$). $NH_3$ is introduced into an engine exhaust system upstream of an SCR device by injecting reducing agent (e.g., urea) into an exhaust pathway, or is generated in an upstream catalyst. Urea is one example of a reducing agent, where the urea entropically decomposes to $NH_3$ under high temperature conditions. The SCR facilitates the reaction between $NH_3$ and $NO_x$ to convert $NO_x$ into nitrogen ($N_2$) and water ($H_2O$). However, as recognized by the inventors herein, issues with reactivity arise during cold-starts (e.g., engine temperature less than an ambient temperature), where an SCR may not reach a temperature suitable for reacting with $NO_x$.

To account for cold-start emissions, an exhaust system may include a first, compact SCR adjacent or closer to an exhaust manifold and a second SCR at a location downstream of the first SCR relative to a direction of exhaust flow. By doing this, the first SCR may reach a light-off temperature quickly, even during cold-starts, while the second SCR, larger than the first SCR, may treat emissions outside of engine cold-starts. However, such systems may be expensive and inefficient. As an example, multi-SCR systems may include separate urea injectors for supplying urea to the first and second SCRs. This may involve a more convoluted control system to operate the injectors. As another example, multi-SCR systems may include a single urea injector upstream of the first SCR, where the urea injector inundates the first SCR and allows exhaust gas to flow excess $NH_3$ to the second SCR. However, this may be inefficient as the excess urea at the first SCR is consumed during higher engine loads (e.g., high load).

Other attempts to address multi-SCR systems include redirecting a urea injection via a bypass. One example approach is shown by Hirota et al. in U.S. Pat. No. 6,192,675. Therein, a bypass redirects a portion of exhaust gas mixed with urea to a second SCR downstream of the first SCR without flowing through the first SCR. Furthermore, the first SCR may comprise capillaries and/or other flow passages comprising no catalytic components such that urea passes therethrough without interacting with the first SCR.

However, the inventors herein have recognized potential issues with such systems. As one example, a flow control valve and appropriate valve actuator are located in the bypass, thereby increasing a manufacturing cost of the exhaust system and introducing components susceptible to degradation. Furthermore, the bypass passage introduces packaging restraints to the exhaust system, increasing its size and resulting in added weight to the system.

In one example, the issues described above may be addressed by a method for treating exhaust gases comprising adjusting a pressure of a reductant injector positioned upstream of a first catalyst in an exhaust passage, wherein the pressure alters a reductant distribution in the exhaust passage, responsive to an SCR temperature, wherein a second SCR device is arranged downstream of a first SCR device. In this way, reductant is sufficiently supplied to two aftertreament devices arranged in series along a passage without a bypass and corresponding bypass valves.

As one example, the first SCR device further comprises one or more flow-through regions which allow the passage of reductant from the injector to the second SCR device. The flow-through regions comprise a decreased catalytic composition compared to catalytic regions of the first SCR device. As such, exhaust gas carrying reductant flowing through the flow-through regions deposits little to no reductant. An amount of reductant flowing through the flow-through regions is adjusted by a reductant injection pressure, which may adjust a reductant radial distribution. In one example, the flow-through regions are located on an outer region of the first SCR and the catalytic regions are located along a central core, as such, an increased reductant pressure directs reductant toward outer regions of the first SCR device. Thus, a decreased reductant pressure, relative to the increased reductant pressure, directs reductant toward catalytic regions (e.g., the central core) of the first SCR device. Thus, the flow-through regions are strategically located along the first SCR device. To further decrease the cost of the present disclosure compared to that of Hirota, the first SCR device may be smaller than the second SCR device. As such, a lesser amount of precious metals may be included in the present disclosure compared to an amount used by Hirota.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a method for monitoring the aftertreatment devices in the exhaust system, along with adjusting a urea injection from a urea injector positioned in the exhaust system upstream of the aftertreatment devices.

FIG. 7 is a plot of an example engine operating sequence over time where urea injection pressures are adjusted based on a condition of one or more aftertreatment devices.

FIG. 8 is a plot of an example engine operating sequence over time where a diagnostic routine is performed following completion of a threshold duration subsequent an injection.

DETAILED DESCRIPTION

Figure 1:
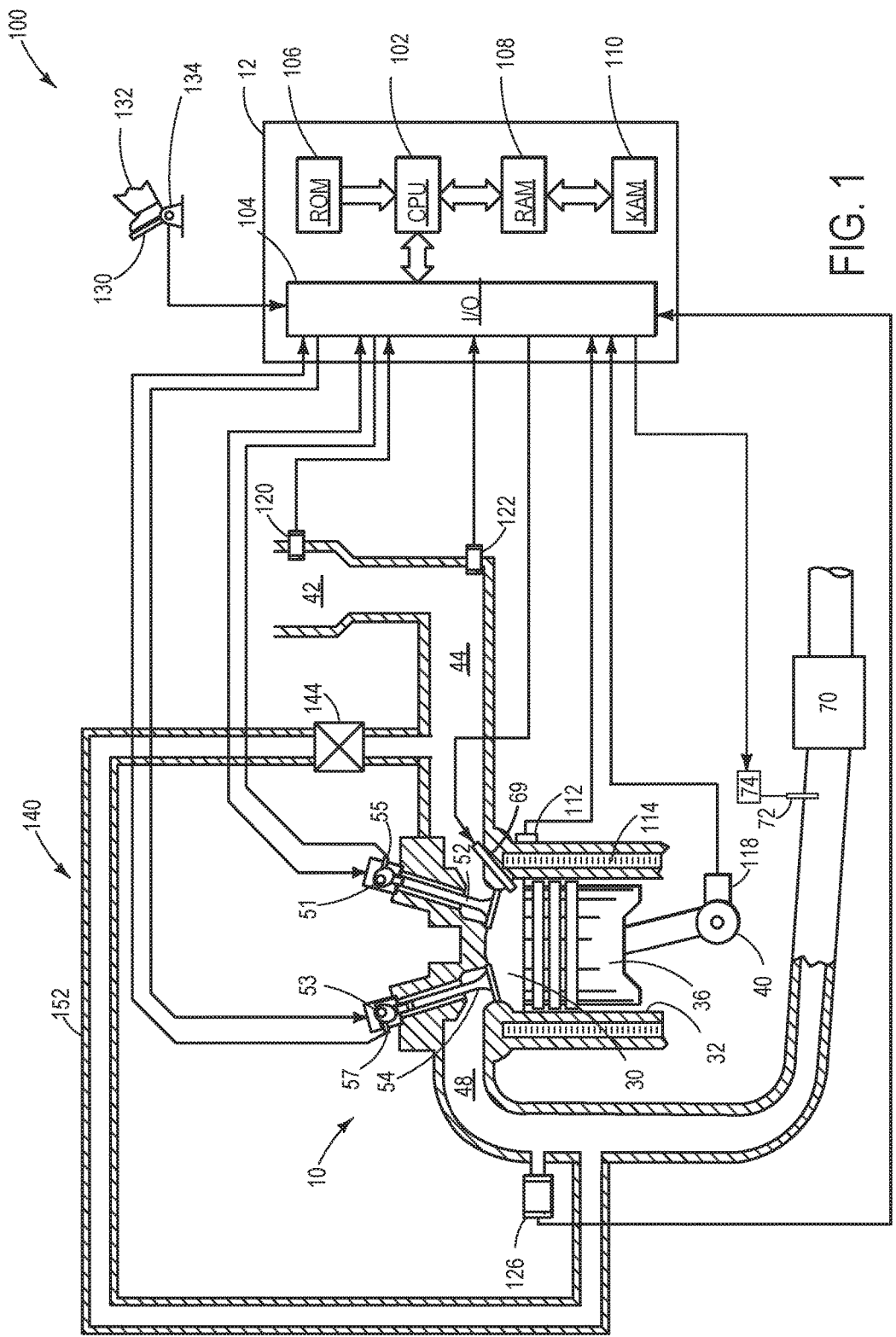
FIG. 1 shows an engine with a cylinder.
Figure 2:
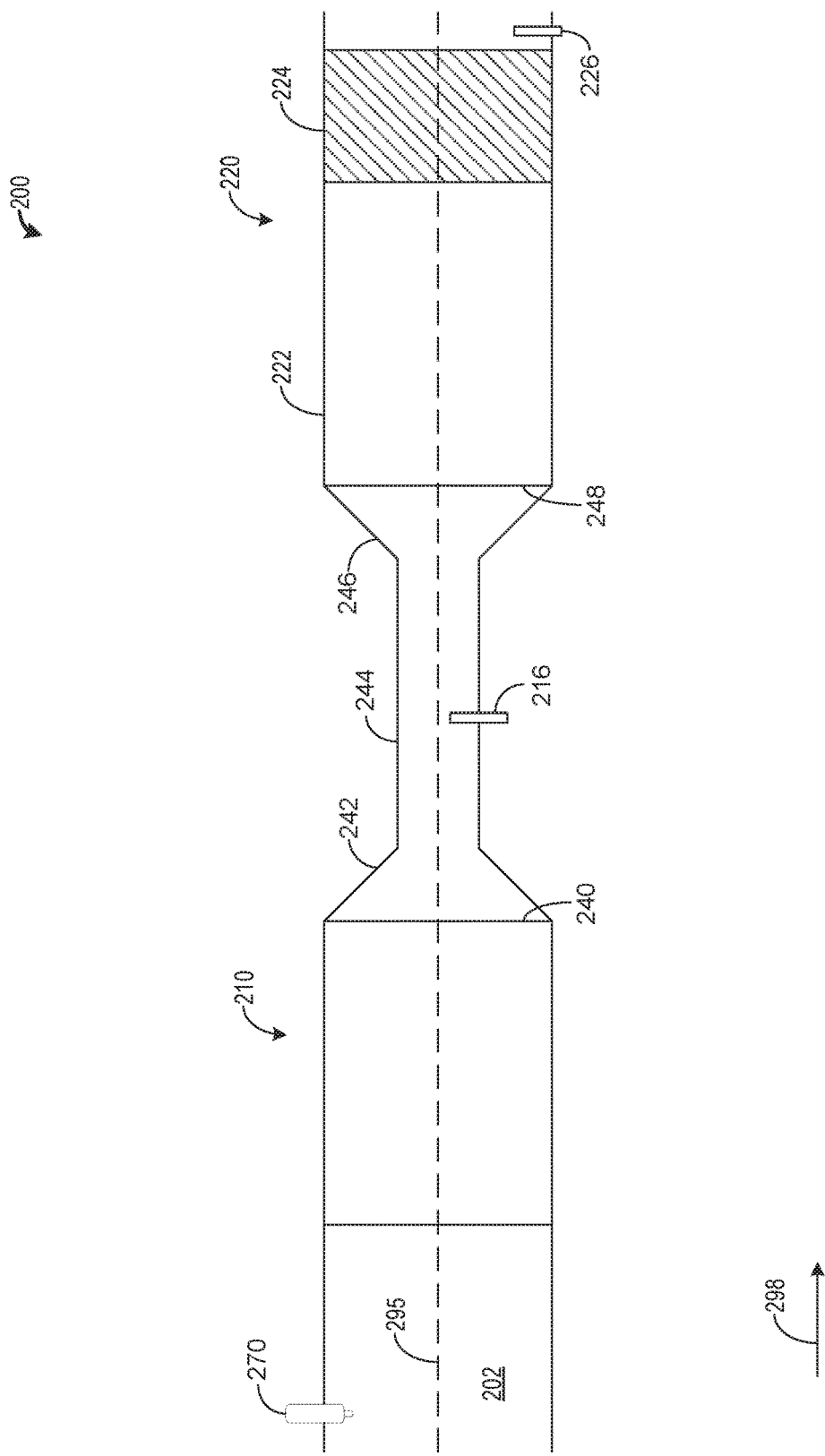
FIG. 2 shows a first exhaust system comprising aftertreatment devices arranged along an exhaust passage.

The following description relates to systems and methods for an exhaust passage comprising first and second aftertreatment devices cascaded along the exhaust passage. Herein, the aftertreatment devices are SCR devices. The exhaust passage is fluidly coupled to an outlet of an engine comprising one or more cylinders, as shown in FIG. 1. The exhaust passage comprises a single urea injector located upstream of a most upstream SCR device, as shown in FIG. 2. The figure further shows a first SCR device located upstream of a second SCR device relative to a direction of exhaust gas flow. The SCR devices are arranged along and fluidly coupled by the exhaust passage. As such, there are no other outlets and/or passages located between the first and second SCR devices. The first SCR device is partially coated with an SCR washcoat (e.g., catalytic elements) and the second SCR device is fully coated with the washcoat. By doing this, various geometries may be realized for flow-through passages (e.g., regions lacking catalytic elements) located in the first SCR device, as shown in FIGS. 3A, 3B, 3C, and 3D. The flow-through and/or bypass passages of the first SCR device are configured to allow reductant from an injector upstream of the first SCR device to flow freely to the second SCR device.

Figure 4:
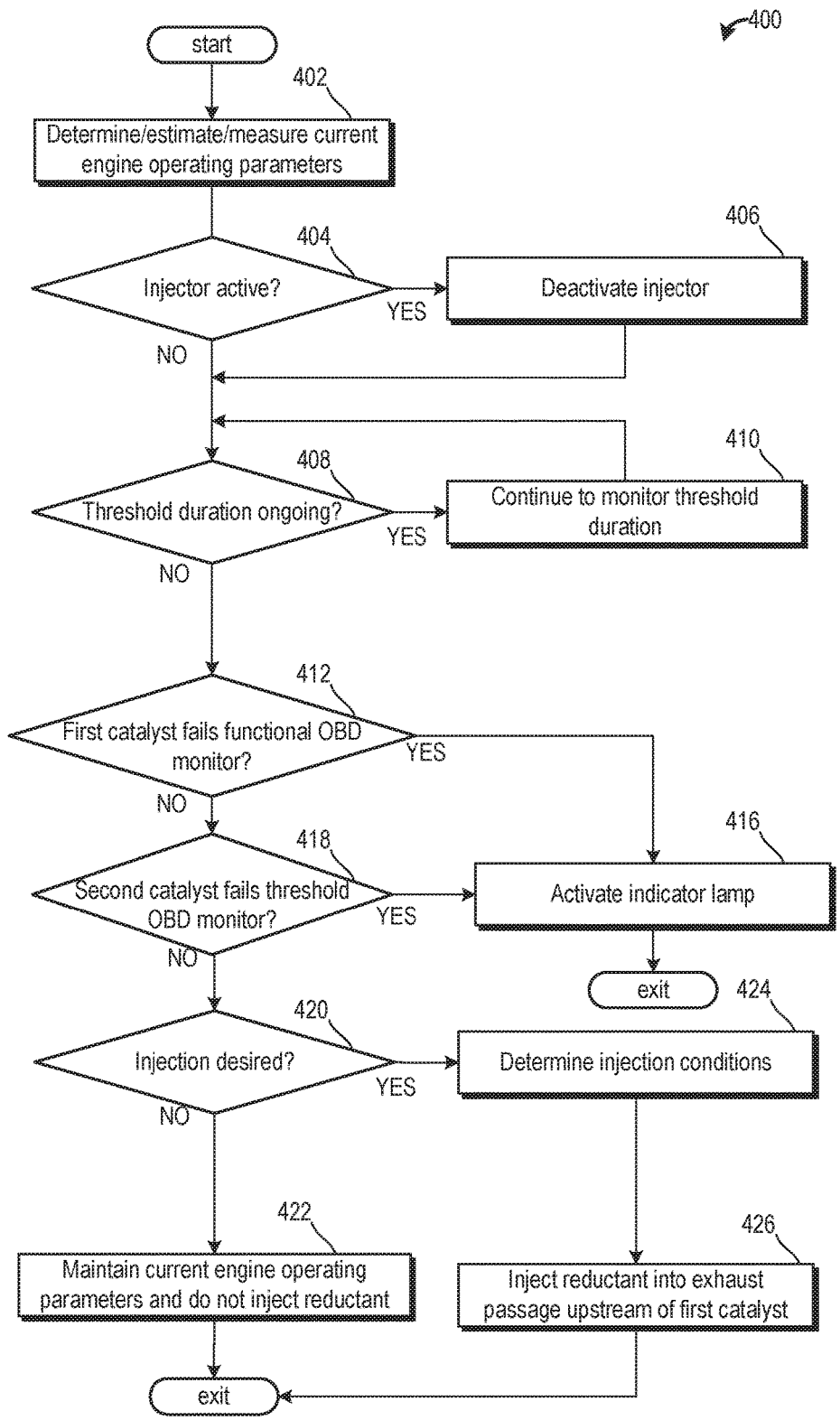
FIG. 4 shows a method for monitoring the aftertreatment devices in the exhaust system, along with injecting urea from a urea injector positioned in the exhaust system upstream of the aftertreatment devices.
Figure 5:
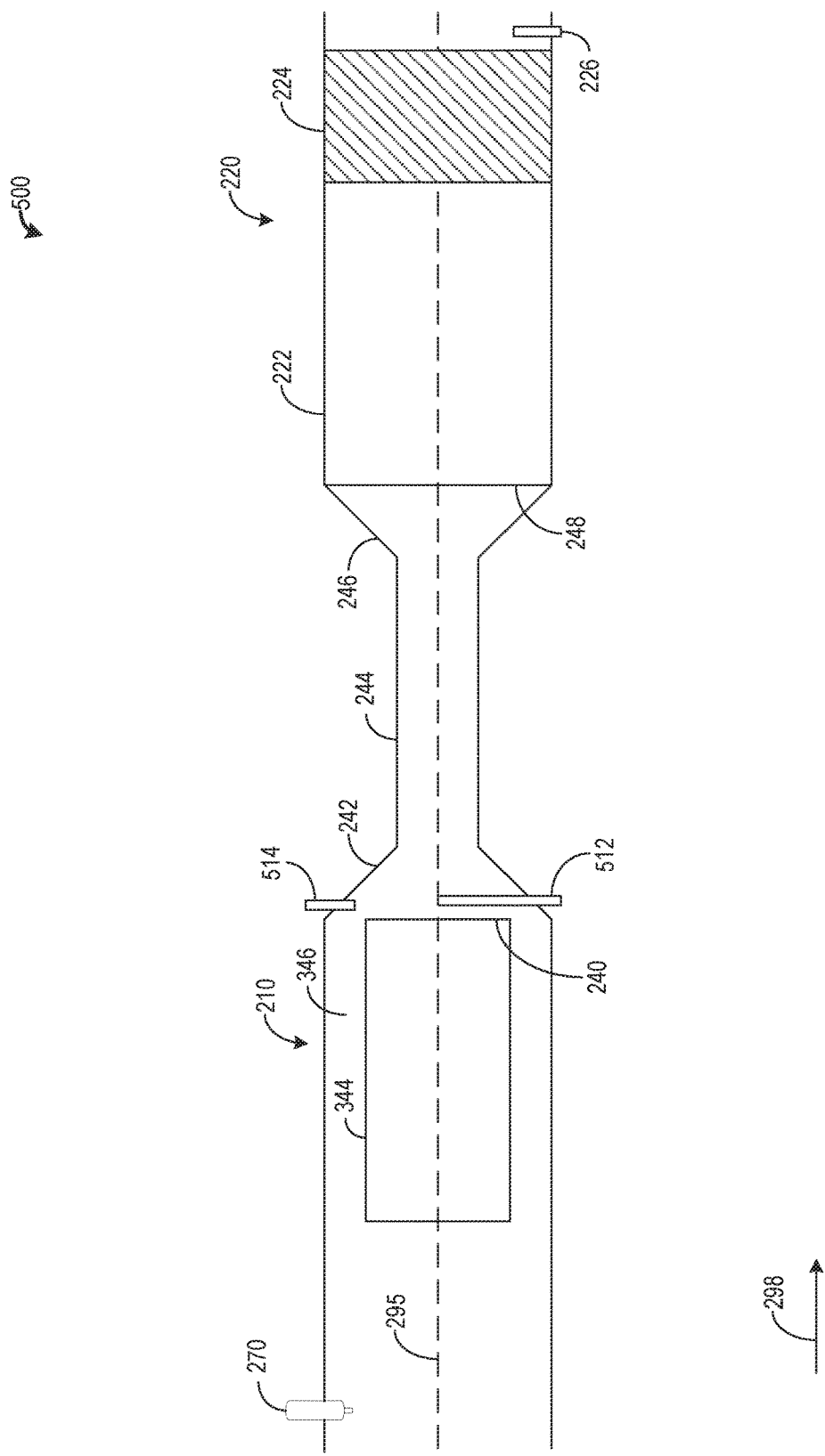
FIG. 5 shows a second exhaust system comprising aftertreatment devices along an exhaust passage.

A method for operating the injector upstream of the first SCR device is shown in FIG. 4. A second embodiment of the exhaust passage is shown in FIG. 5. Therein, the exhaust passage comprises first and second $NO_x$ sensors directly downstream of and adjacent to the first SCR device and a third $NO_x$ sensor directly downstream of the second SCR device. The sensors downstream of the first SCR device differ in that a first sensor is located downstream of a catalytic region and the second sensor is located behind a flow-through region. A method for adjusting injection pressures based on sensed information from the sensors depicted in FIG. 5 is shown in FIG. 6. A first operational sequence depicting changes in injection conditions for the first and second SCR devices over time is shown in FIG. 7. A second operational sequence depicting a diagnostic sequence following a threshold duration after an injection is shown in FIG. 8.

FIGS. 1-3D and 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30. A mass air flow sensor 120 and a manifold air pressure sensor 122 for sensing an amount of air entering engine 10.

Although the engine 10 is shown as a sparkless engine, the cylinder 30 may be fitted with a spark plug without departing from the scope of the present disclosure. Additionally, an exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

In some examples, the emission control device 70 may comprise one or more SCR devices arranged in series along the exhaust passage 48. In one example, the emission control device 70 comprises a first SCR device and a second SCR device located downstream of the first SCR device relative to a direction of exhaust gas flow. As shown, a reductant injector 72 is arranged upstream of the emission control device 70. A reservoir 74 may supply reductant to the injector 72 when desired, as will be described below, based on instructions from the controller 12. In one example, the reductant injector 72 is a urea injector and the reservoir 74 stores urea. Additionally or alternatively, the reductant is AD-blue.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses each revolution of the crankshaft. The controller 12 receives signals from the various sensors of FIG. 1 and employs the various actuators of FIG. 1 to adjust engine operation based on the received signals and instructions stored on a memory of the controller. For example, adjusting a reductant injection may include adjusting an actuator of the injector 72 to adjust the reductant injection pressure based on a reductant load on the emission control device 70 and/or a temperature of the emission control device 70, as will be described in greater detail below.

The storage medium read-only memory 106 can be programmed with computer readable data representing non-transitory instructions executable by the processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12 to be carried out by the controller in combination with the engine hardware, as illustrated in FIG. 1.

Turning now to FIG. 2, it shows a first exemplary exhaust system 200, which may be used as the emission control device 70 of FIG. 1. Thus, exhaust passage 202 may be used similarly to the exhaust passage 48 of FIG. 1 and reductant injector 270 may be used similarly to the reductant injector 72 of FIG. 1.

The exhaust system 200 comprises a first catalyst 210 upstream of a second catalyst 220 relative to a direction of exhaust gas flow (arrow 298). Herein, the first catalyst 210 is a first SCR device 210 and the second catalyst 220 is a second SCR device 220. The first SCR device 210 and the second SCR device 220 are arranged in series along a horizontal axis 295 parallel to the direction of exhaust gas flow (arrow 298). In one example, the horizontal axis 295 is a central longitudinal axis of the exhaust passage 202 and passes through central cores of the first 210 and second 220 SCR devices. The first SCR device 210 and second SCR device 220 are configured to allow exhaust gas to flow therethrough and treat $NO_x$.

The first SCR device 210 and the second SCR device 220 may comprise unequal compositions of elements. Furthermore, the first SCR device 210 and the second SCR device 220 may be differently sized. For example, diameters of the first 210 and second 220 SCR devices are substantially equal but a length of the devices, along the axis 295, may be unequal. In one example, the second SCR device 220 is longer than the first SCR device 210. It will be appreciated that the first 210 and second 220 SCR devices may be substantially identical in size without departing from the scope of the present disclosure. A size difference is shown on the second SCR device 220, wherein a solid white section 222 represents a size of the first SCR device 210 and a striped section 224 represents an additional SCR portion of the second SCR device 220. The sections 222 and 224 are illustrative and it will be appreciated that the second SCR device 220 is a single, contiguous device.

In one example, the first SCR device 210 may achieve higher temperatures than the second SCR device 220 due to its proximity to an exhaust manifold. Thus, the first SCR device 210 comprises a greater amount of elements providing higher thermal durability than the second SCR device 220. In one example, the first SCR device comprises a greater amount of zeolite catalysts and/or iron- and copper-exchanged zeolites than the second SCR device 220. Other transition metals (e.g., precious metals) may be used without departing from the scope of the present disclosure. The catalysts coat a substrate, which may be composed of ceramic materials, in a honeycomb-shape, corrugated-shape, or different porous shape for allowing exhaust gas to flow therethrough. In one example, the substrate of the first SCR device 210 may comprise activated carbon to facilitate $NO_x$ reduction at lower temperatures while the substrate of the second SCR device 220 may not. As such, the first SCR device 210 may be configured to treat exhaust gas during cold-starts where an engine temperature is less than an ambient temperature.

The first SCR device 210 and the second SCR device 220 may be further differentiated by their respective SCR washcoat amounts. Herein, an SCR washcoat is a catalytic material coating portions of the SCR substrate, wherein the catalysts are capable of storing reductant and reacting with $NO_x$. The first SCR device 210 comprises less than 100% SCR washcoat, in one example. Said another way, the first SCR device 210 comprises regions without the SCR washcoat (e.g., flow-through regions and/or bypass regions) and regions with the SCR washcoat (e.g., catalytic regions). 50-90% of the first SCR device 210 may comprise the SCR washcoat while the second SCR device 220 is fully coated (e.g., 100 coverage). As described above, the second SCR device 220 is larger than the first SCR device 210 by an amount equal to the striped region 224. As such, a total mass of SCR washcoat applied to the second SCR device 220 is greater than an amount applied to the first SCR device 210. In this way, the second SCR device 220 may be relied upon more heavily to treat $NO_x$ emissions than the first SCR device 210 during some engine operating conditions (e.g., engine operating conditions outside of a cold-start).

Thus, the first SCR device 210 comprises bypass and catalytic regions, while the second SCR device 220 comprises catalytic regions without any bypass regions, in one example. By doing this, reductant from a reductant injector 270 may freely flow through the bypass regions of the first SCR device 210 while being stored on catalytic regions of the first SCR device 210. Reductant flowing through the bypass regions flows toward the second SCR device 220, where the reductant may be stored thereon and may not flow freely therethrough.

The reductant injector 270 is located upstream of the first SCR device 210 via one or more of welds, fusions, adhesives, bosses, and other suitable coupling elements. As shown, the injector 270 may inject reductant in a direction substantially orthogonal to the direction of exhaust gas flow 298 and horizontal axis 295. Additionally or alternatively, the injector 270 may be positioned oblique to the direction of exhaust gas flow 298, facing either an upstream direction (away from the first SCR device 210) or a downstream direction (toward the first SCR device 210). In some examples, additionally or alternatively, the injector 270 may further comprise an actuator configured to actuate the injector, thereby adjusting an angle of the injector 270. In one example, the actuator may move the injector 270 ±45° from the orthogonal position depicted. The injector 270 is further configured to inject reductant at a variety of pressures based on a signal from a controller to an injection actuator of the injector 270 (e.g., controller 12 of FIG. 1). The pressure may be adjusted based on a temperature of the first SCR device 210 and/or a temperature of the second SCR device 220. Additionally or alternatively, the pressure may be adjusted based on a measured $NH_3$ slip through one or more of the first 210 and second 220 SCR devices. Adjusting the injection pressure is described in greater detail below with respect to FIGS. 4 and 6.

In some examples, additionally or alternatively, a mixer is located between the reductant injector 270 and the first SCR device 210. The mixer is configured to merge exhaust gas and reductant injection flows. The mixer may direct reductant to desired portions of the exhaust passage 202 based on the injection pressure, where the desired portions are based on measured conditions of the first SCR device 210 and/or second SCR device 220 described above. For example, an outer core of the first SCR device may be a flow-through region and/or bypass region and a central core may be a catalytic region. As such, the injection conditions may be adjusted to promote a greater amount of reductant flow to the outer regions when the second SCR device 220 demands reductant. In one example, the injection pressure and/or amount may be adjusted to shift a radial distribution of the reductant into the exhaust region upstream of the first SCR device 210. As an example, increasing the injection pressure leads to a greater amount of reductant flowing to outer radial regions of the exhaust passage, resulting in a greater amount of reductant flowing to the second SCR device 220. Thus, decreasing the injection pressure leads to a greater amount of reductant flowing to inner radial regions of the exhaust passage, resulting in a lesser amount of reductant flowing to the second SCR device 220.

Due to the arrangement of the first SCR device 210 and the second SCR device 220, exhaust gas, and therefore exhaust gas containing reductant, flows through the first SCR device 210 before flowing to the second SCR device 220. An outlet cone 242 is located at a downstream end of the first SCR device (e.g., outlet 240). A diameter of the outlet cone 242 decreases in the downstream direction, where a largest diameter of the cone corresponds to the outlet 240 and a smallest diameter corresponds to the connecting passage 244. A diameter of the connecting passage 244 remains substantially constant along the horizontal axis 295 in the downstream direction. The connecting passage 244 may simply represent a portion of the exhaust passage 202 located between the outlet cone 240 and an inlet cone 246. Unlike the outlet cone 240, the inlet cone 246 increases in diameter in the downstream direction, where a smallest diameter of the inlet cone is located at the connecting passage 244 and a largest diameter is located at an inlet 248 of the second SCR device 220. In this way, no other outlets and/or passages are located between the first SCR device 210 and the second SCR device 220. As such, exhaust gas flows through the first SCR device before flowing to the second SCR device 220, in one example.

A sensor 216 is located in a bottom portion of the connecting passage 244. However, the sensor 216 may be located in other portions of the connecting passage 244 (e.g., top portion) without departing from the scope of the present disclosure. The sensor 216 is a $NO_x$ sensor, in one example. As such, the sensor 216 provides feedback regarding $NO_x$ flow through the first SCR device 210. In one example, if $NO_x$ sensed by the sensor 216 is greater than a first threshold $NO_x$, then the first SCR device 210 comprises an amount of $NH_3$ less than a first threshold $NH_3$. As such, too much $NO_x$ is leaking from the first SCR device 210 and an injection is demanded to restore $NH_3$ stores in the first SCR device 210.

Furthermore, additionally or alternatively, the sensor 216 may measure a temperature of exhaust gas flowing through the first SCR device 210. The controller may estimate a temperature of the first SCR device 210 and a temperature of the second SCR device 220 based on an exhaust gas temperature sensed by the sensor 216. In this way, sensor 216 may comprise a plurality of functions. Alternatively, a plurality of sensors may be located in the connecting passage 244 configured to achieve the functions described above.

A sensor 226 is located in a bottom portion of the exhaust passage 202 downstream of the second SCR device 220. Herein, the sensor 216 is an upstream sensor 216 and the sensor 226 is a downstream sensor 226. The downstream sensor 226 may be located in radially different portions of the exhaust passage 202 (e.g., a top portion) without departing from the scope of the present disclosure. In one example, the downstream sensor 226 is located in a location of the exhaust passage 202 radially similar to a location of the upstream sensor 216 in the connecting passage 244. As an example, if the upstream sensor 216 is located in a bottom portion of the connecting passage 244, then the downstream sensor 226 is also located in a bottom portion of the exhaust passage 202. The downstream sensor 226 is substantially identical to the upstream sensor 216 and is configured to measure one or more of $NO_x$, reductant concentration in exhaust gas, and temperature. By doing this, feedback from the sensors may be compared, resulting in more reliable estimates of conditions in the first SCR device 210 and the second SCR device 220.

$NH_3$ stores of the second SCR device 220 may be monitored via the downstream sensor 226 similar to the first SCR device 210 and the upstream sensor 216. Specifically, the downstream sensor 226 may monitor if a concentration of $NO_x$ downstream of the second SCR device 220 exceeds a second threshold $NO_x$. If the $NO_x$ downstream of the second SCR device exceeds the second threshold $NO_x$, then an $NH_3$ load on the second SCR device 220 is less than a second threshold $NH_3$ and an injection is demanded.

As illustrated, the first SCR device 210 occludes a flow path of reductant from the reductant injector 270 to the second SCR device 220. One or more cutouts and geometrical features may be integrated into the first SCR device 210 to improve reductant flow to the second SCR device 220. For example, reductant may flow through the bypasses (flow-through passages) located in the first SCR device 210 without being stored thereon. As such, less reductant may be deposited in the less catalytically dense portions compared to the more catalytically dense portions, allowing reductant to freely flow through the bypasses of the first SCR device 210 to the second SCR device 220. In this way, reductant flow to the second SCR device 220 may be improved while utilizing only a single injector upstream of the first SCR device 210. Furthermore, injections from the reductant injector 270 may be adjusted to direct reductant to mix with exhaust gas flowing through the less catalytically dense portions of the first SCR device 210 when the second SCR device 220 demands reductant. The opposite may be true when the first SCR device 210 demands reductant (e.g., the injection is directed toward exhaust gas flowing through the catalytically dense portions of the first SCR device 210. Embodiments of the first SCR device 210 are described below with respect to FIGS. 3A-3D. A method for injecting reductant into the exhaust passage 202 is described in FIG. 4.

Thus, an exhaust system comprises an exhaust passage, first and second SCR devices cascaded along the exhaust passage, and where the first SCR device located proximal to an exhaust manifold, is upstream of the second SCR device relative to a direction of exhaust gas flow, a reductant injector located upstream of the first SCR device, and a controller with a storage medium with computer-readable instruction stored thereon for adjusting an injection pressure and engine operating parameters in response to a $NO_x$ concentration downstream of the first or second SCR devices being greater than a threshold $NO_x$ concentration. The first SCR device comprises a first threshold $NO_x$ concentration and the second SCR device comprises a second threshold $NO_x$ concentration, and where the $NO_x$ is measured by a first sensor located between the first and second SCR devices and by a second sensor located downstream of the second SCR device, respectively. The first sensor extends to a central axis of the exhaust passage and measures exhaust gas directly downstream of a catalytic region of the first SCR device.

A controller may adjust injection conditions based on feedgas NOx concentrations, $NH_3$ storage on and/or temperatures of the first and/or second SCR devices. Herein, feedgas $NO_x$ refers to engine $NO_x$ output. The injection conditions are described in the methods below.

Turning now to FIGS. 3A, 3B, 3C, and 3D, they show exemplary embodiments of the first SCR device (e.g., first SCR device 210 of FIG. 2). In some examples, additionally or alternatively, the embodiments illustrated may also represent embodiments of the second SCR device (e.g., second SCR device 220 of FIG. 2). Portions of the first SCR device comprising a greater amount of SCR washcoat (e.g., catalytic elements) are illustrated by more densely filled white areas comprising black dots. Conversely, portions of the first SCR device comprising a lesser amount of SCR washcoat are illustrated in white or less densely filled white areas comprising black dots. In this way, the portions of the first SCR device comprising more SCR washcoat comprise a greater number of black dots. As such, completely white portions of the SCR devices depicted are completely omitted of SCR washcoat.

Figure 3A:
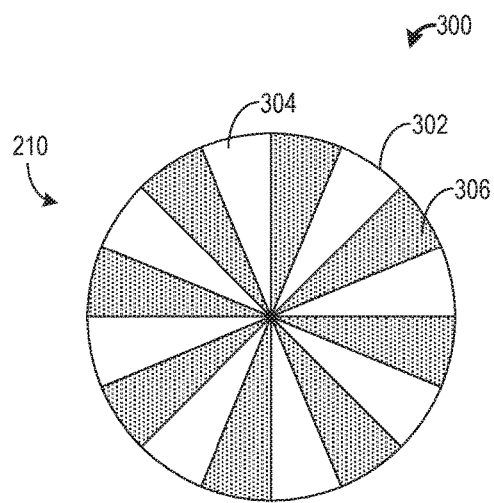
FIGS. 3A, 3B, 3C, and 3D show exemplary embodiments of an aftertreatment device located in an upstream portion of the exhaust passage.

Turning now to FIG. 3A, it shows a first exemplary embodiment 300 of a first SCR device 210. As shown, the embodiment 300 is divided into radial zones comprising SCR washcoat (e.g., catalyst zones 306) and no SCR washcoat (e.g., flow-through zones 304). The catalyst zones 306 and flow-through zones 304 alternate such that similar zones are not adjacent one another. Said another way, each catalyst zone of the catalyst zones 306 is sandwiched by two flow-through zones 304. The catalyst zones 306 and the flow-through zones 304 extend from a center of the first SCR device 210 to an exhaust pipe 302 of an exhaust passage (e.g., exhaust passage 48 of FIG. 1 or exhaust passage 202 of FIG. 2). In one example, the zones are substantially identical in size and shape, wherein a shape of the zones is substantially triangular, however, other shapes may be realized without departing from the scope of the present disclosure.

As shown, the first exemplary embodiment 300 comprises a substantially equal volume of catalyst zones 306 and flow-through zones 304. The catalyst zones 306 may receive and store reductant while the flow-through zones 304 may allow exhaust gas and reductant to flow readily therethrough to a second SCR device. In one example, the flow-through zones 304 are sealed from the catalyst zones 306. In this way, exhaust gas in a flow-through zone of the flow-through zones 304 may not flow into adjacent catalyst zones 306 or other flow-through zones 304.

In some examples, the catalyst zones 306 and the flow-through zones 304 may be circumferential zones concentric about the center of the first SCR device 210. The zones may still alternate, increasing in diameter from the center to the exhaust pipe 302.

Figure 3B:
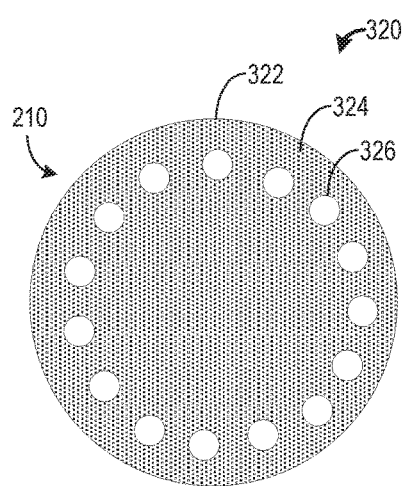

Turning now to FIG. 3B, it shows a second exemplary embodiment 320 of the first SCR device 210. As shown, the second embodiment 320 comprises a plurality of flow-through holes 326 extending through the catalyst zone 324. The flow-through holes 326 are located adjacent to an exhaust pipe 322 of an exhaust passage (e.g., exhaust passage 48 of FIG. 1 and/or exhaust passage 202 of FIG. 2), equally spaced from a center of the first SCR device 210. However, the flow-through holes 326 may be located adjacent to a center of the first SCR device 210 (e.g., distal to the exhaust pipe 322) without departing from the scope of the present disclosure. The flow-through holes 326 are drilled through the catalyst zone 324 and may be hermetically sealed from the catalyst zone 324 and from one another.

Figure 3C:
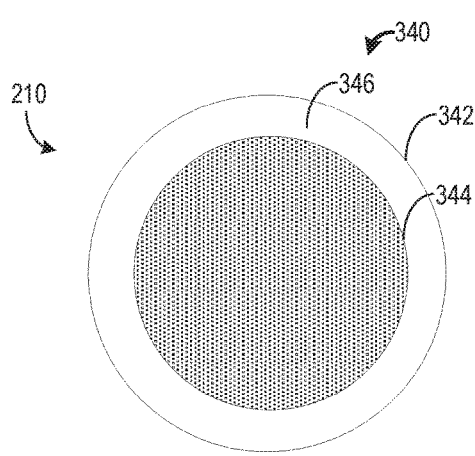

Turning now to FIG. 3C, it shows a third exemplary embodiment 340 of the first SCR device 210. As shown, the third embodiment 340 comprises an annular flow-through passage 346 located between the catalyst zone 344 and an exhaust pipe 342 of an exhaust passage (e.g., exhaust passage 48 of FIG. 1 and/or exhaust passage 202 of FIG. 2). Thus, the catalyst zone 344 is located along a center of the first SCR device 210 and the flow-through passage 346 is located distal to the center. Alternatively, the catalyst zone 344 may be located between the exhaust pipe 342 and the flow-through passage 346. In this way, exhaust gas flowing through the flow-through passage 346 does not deposit reductant or flow through the catalyst zone 344.

Figure 3D:
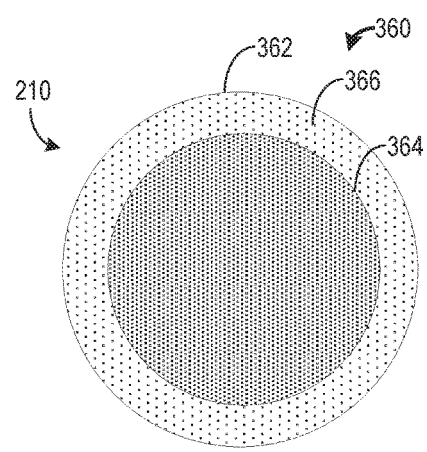

Turning now to FIG. 3D, it shows a fourth exemplary embodiment 360 of the first SCR device 210. As shown, the fourth exemplary embodiment 360 is substantially identical to the third exemplary embodiment 340. However, the flow-through region 366, which is located between the catalyst zone 364 and the exhaust pipe 362, comprises a small amount of SCR washcoat. As described above, the flow-through regions (e.g., flow-through zones 304, flow-through holes 326, and flow-through passage 346) comprise zero SCR washcoat. However, the flow-through region 366 comprises an amount of SCR washcoat that is less than an amount of SCR washcoat applied to the catalyst zone 364. As such, a lesser amount of reductant is stored in the flow-through region 366 compared to the catalyst zone 364. In one example, 10% of the amount of reductant stored in the catalyst zone 364 is stored in the flow-through zone 366. It will be appreciated that other amounts of reductant may be stored in the flow-through zone 366 without departing from the scope of the present disclosure. In this way, a greater amount of reductant flows through the flow-through region 366 to a second SCR device (e.g., second SCR device 220) compared to the catalyst zone 364. Additionally, an entirety of the embodiment 360 is able to treat $NO_x$ while only portions of the embodiments depicted above may treat $NO_x$.

Turning now to FIG. 4, it shows a method 400 for monitoring a first SCR device and a second SCR device (e.g., first SCR device 210 and second SCR device 220 of FIG. 2). Instructions for carrying out method 400 and the rest of the methods included herein (e.g., method 600 of FIG. 6) may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 begins at 402, where the method 400 determines, estimates, and/or measures current engine operating parameters. The current engine operating parameters may include one or more of engine temperature, engine load, ambient temperature, ambient humidity, EGR flow rate, engine speed, vehicle speed, exhaust gas temperature, and air/fuel ratio.

At 404, the method 400 includes determining if a reductant injector (e.g., injector 270 of FIG. 2) is active. The injector is active if reductant is being injected into the exhaust passage upstream of the first SCR device. As such, if the injector is active, then the method 400 proceeds to 406 to deactivate the injector.

At any rate, the method 400 proceeds to 408 following 404 or 406 to determine if a threshold duration is occurring. $NO_x$ sensors are cross sensitive to $NO_x$ and $NH_3$, wherein feedback from the $NO_x$ sensor may be artificially high if $NH_3$ is also sensed. Hence, the threshold duration may be substantially equal to an amount of time needed following an injection for $NH_3$ to no longer be sensed by the upstream and downstream sensors. Said another way, $NH_3$ slip is no longer occurring following the threshold duration. In some examples, the threshold duration is adjusted based on injection amount, injection pressure, engine load, engine temperature, ambient humidity, engine rotation, exhaust gas flow rate, EGR flow rate, and air/fuel ratio. For example, the threshold duration increases as the injection amount and/or injection pressure increases. As such, if a sufficient amount of time has not elapsed and the threshold duration is ongoing, then the method 400 proceeds to 410 to continue to monitor if the threshold duration is occurring.

If the threshold duration is complete and a sufficient amount of time has elapsed, then the method 400 proceeds to 412, where the method 400 determines if the first SCR device fails a functional on-board diagnostic (OBD) monitor. If a feedgas $NO_x$ concentration is substantially similar to a $NO_x$ concentration measured at the upstream sensor, then the first SCR device comprises less than a first threshold amount of catalytic activity and fails the functional OBD monitor. If the $NO_x$ concentration sensed by the upstream sensor is less than the feedgas $NO_x$ concentration, then the first SCR device comprises at least the first threshold amount of catalytic activity and passes the functional OBD monitor. In one example, the first threshold amount of catalytic activity is a minimum amount of catalytic activity. The feedgas $NO_x$ concentration is based on one more of exhaust gas temperatures, EGR flow, ambient humidity, engine temperature, air/fuel ratio, and manifold pressure. Additionally or alternatively, the feedgas $NO_x$ concentration is based on experimental values stored in a look-up table corresponding to one or more current engine operating parameters including but not limited to exhaust gas temperatures, EGR flow, ambient humidity, engine temperature, air/fuel ratio, and manifold pressure. As such, the first SCR device passes the functional OBD monitor if at least some $NO_x$ reduction is measured, which corresponds to $NO_x$ sensed by the upstream sensor being less than an estimated feedgas $NO_x$.

If the first SCR device fails the functional OBD monitor, then the method 400 proceeds to 416 activate an indicator lamp. Thus, the first SCR device may comprise zero catalytic activity and may be degraded. Alternatively, if the first SCR device passes the functional OBD monitor, then the method 400 proceeds to 418. Additionally or alternatively, the method 400 may proceed to 418 following flagging (e.g., activating the indicator lamp) the degradation of the first SCR device at 416.

At 418, the method 400 determines if the second SCR device fails a threshold OBD monitor. The threshold OBD monitor determines if the second SCR device reduces incoming $NO_x$ to a second threshold $NO_x$ amount. The second threshold $NO_x$ amount is a fixed amount substantially equal to an emission standard, independent of the incoming $NO_x$ amount, in one example. Thus, if the downstream sensor senses $NO_x$ amounts greater than the second threshold $NO_x$ amount, then the second SCR device comprises less than a second threshold amount of catalytic activity and fails the threshold OBD monitor. Alternatively, if the downstream sensor senses $NO_x$ amounts less than the second threshold $NO_x$ amount, then the second SCR device comprises greater than the second threshold amount of catalytic activity.

By performing a diagnostic routine including the functional and threshold OBD monitors following a urea injection, it may be assumed during the diagnostic that the first and/or second SCR devices are sufficiently loaded with $NH_3$ to properly treat $NO_x$ emissions. Thus, higher than expected $NO_x$ measurements at the upstream or downstream sensors may be attributed to a catalytic degradation of the first or second SCR devices, respectively.

If the second SCR device fails the threshold OBD monitor, then the method 400 proceeds to 416 to activate an indicator lamp. As such, the second SCR device may comprise less than a desired amount of catalytic activity and thus does not sufficiently treat $NO_x$. In some examples, the method 400 may adjust engine operating parameters in response to the first SCR device failing the functional OBD monitor and/or the second SCR device failing the threshold OBD monitor. As such, engine adjustments in response to the first SCR device failing the functional OBD monitor may be less intrusive than the second SCR device failing the threshold OBD monitor. For example, adjusting engine operating parameters in response to the first SCR device failing the functional OBD monitor may include preventing future injection conditioned for only the first SCR device, whereas adjusting engine operating parameters in response to the second SCR device failing the threshold OBD monitor includes one or more of increasing EGR flow, retarding spark, decreasing air/fuel ratio, and increasing and/or activating an in-cylinder water injection.

In some embodiments, additionally or alternatively, the threshold OBD monitor may be based on an average efficiency of the second SCR device determined over a period of time, wherein the period of time includes various efficiencies corresponding to different engine operating parameters. In this way, a single average efficiency of the second SCR device may be used across a plurality of engine operating parameters to perform the threshold OBD monitor.

Alternatively, an average efficiency may correspond to a specific set of current engine operating parameters. For example, a first average efficiency may relate to a cold-start including an engine temperature being less than an ambient temperature and a second average efficiency may relate to a mid-engine load with an EGR flow rate of 10%. Thus, the threshold OBD monitor may select an average efficiency from a plurality of average efficiencies from a look-up table most similar to current engine operating parameters for comparing a current second SCR device efficiency to the selected average efficiency.

In one example, the average efficiency corresponds to an expected reduction capability of the second SCR device at a given set of engine operating parameters. As an example, the second SCR device may reduce 98% of $NO_x$ flowing therethrough when above a threshold light-off temperature and having a $NH_3$ store above 50%. If the second SCR device reduces less than 98% of $NO_x$ flowing therethrough (e.g., reduces 90%) when above the threshold light-off temperature and having $NH_3$ stores above 50%, then the second SCR device may fail the threshold OBD monitor.

If the second SCR device passes the threshold OBD monitor, then the method 400 proceeds to 420 to determine if an injection is desired. Herein, the reductant is urea, which decomposes to $NH_3$ when mixing with hot exhaust gas. The method 400 may estimate an amount of $NO_x$ slippage and compare the estimate to an actual amount of $NO_x$ slippage. In one example, the estimate is a range (e.g., 10±0.5). Furthermore, the comparison may measure a magnitude of a difference between the actual amount and the estimated range. For example, if the range is 9.5-10.5 and the actual value is 10.7, then a value of 0.2 is assigned. Alternatively, if the range is 9.5-10.5 and the actual value is 9.3, than a value of −0.2 is assigned. As such, positive values are applied if the actual value is greater than the range and negative values are assigned if the actual value is less than the range. If the actual value falls within the range, then a value of zero may be assigned. The values are tallied and an estimated $NH_3$ storage may be adjusted to account for cross referencing between $NH_3$ and $NO_x$ at a sensor. For example, the estimated NH3 storage of the first SCR device may be adjusted to increase $NH_3$ if the tally comprises more positive values than negative values as measured by upstream sensor 216. This may be due to the sensor confusing $NH_3$ as $NO_x$ when an SCR is saturated with $NH_3$. Alternatively, the estimated $NH_3$ storage may be adjusted decrease $NH_3$ (e.g., increase $NO_x$) if the tally comprises more negative values than positive values. Thus, an injection may inject more urea if $NO_x$ slip is occurring (e.g., tally comprises more negative values). In this way, the estimated range accounts for and/or attempts to predict $NH_3$ slippage from the SCR. Alternatively, the injection may inject less urea or not be activated at all if $NH_3$ slip is occurring (e.g., tally comprises more positive values).

In one example, additionally or alternatively, $NH_3$ may be determined to be present in exhaust gas flow when SCR efficiency is less than zero. An SCR efficiency of less than zero may be possible when a $NO_x$ sensor senses $NO_x$ and $NH_3$ from an injection. $NH_3$ slip may also be determined via a NOx sensor that is cross sensitive to NOx via low pass filtering the concentration of output from downstream NOx sensor and output from the upstream NOx sensor or model. In one example, if the low pass NOx concentration from the downstream NOx sensor (e.g., the first sensor 512) minus the low pass NOx concentration from the upstream NOx sensor (e.g., the second sensor 514) or model minus a threshold feed gas NOx concentration is greater than zero, $NH_3$ slip may be determined.

In some examples, a desire for urea injection may be determined based on comparing a concentration of $NH_3$ to a threshold $NH_3$ concentration. $NH_3$ is released from an SCR device when it is saturated with $NH_3$. Thus, the threshold $NH_3$ concentration may be based on a concentration of $NH_3$ in an exhaust gas flow indicating the SCR device is fully saturated with $NH_3$. Alternatively, the threshold $NH_3$ concentration may be based on a concentration of $NH_3$ in an exhaust gas flow indicating the SCR comprises an amount of $NH_3$ too low to sufficiently treat $NO_x$. As such, the urea injection is desired if the $NH_3$ concentration is less than the threshold $NH_3$ concentration. Thus, the urea injection is not desired if the $NH_3$ concentration is greater than the threshold $NH_3$ concentration.

Additionally or alternatively, a urea injection is desired based on a comparison between a feedgas $NO_x$ concentration upstream of an SCR device and an exhaust gas $NO_x$ concentration downstream of the SCR device. As an example for the first SCR device, the feedgas $NO_x$ concentration is estimated based on current engine operating parameters and the exhaust gas $NO_x$ concentration is measured by the upstream sensor 216. If the exhaust gas $NO_x$ concentration is not less than the feedgas $NO_x$ concentration by a first threshold amount (e.g., 50% less), then ammonia storage on the first SCR device is less than a desired amount and an injection is demanded. Said another way, if a $NO_x$ concentration downstream of an SCR device is greater than a threshold $NO_x$ concentration, then the SCR device is emitting too much $NO_x$ and demands an injection. The threshold $NO_x$ concentration may be based on an amount of $NO_x$ upstream of the SCR device. In this way, if the threshold $NO_x$ concentration is 80%, then an SCR device demanding an injection is reducing less than 20% of $NO_x$ flowing therethrough. The threshold $NO_x$ concentration may be substantially equal to other percentages without departing from the scope of the present disclosure.

Thus, the first SCR device and the second SCR device comprise a first $NO_x$ concentration threshold and a second $NO_x$ concentration threshold, respectively. If $NO_x$ output from either of the SCR devices is greater than its respective threshold, then the SCR device demands an injection. For example, if $NO_x$ output from the second SCR device is greater than the second $NO_x$ concentration threshold, then $NO_x$ output is too high and the second SCR device demands an injection. Furthermore, by passing the above described threshold OBD monitor, the high $NO_x$ output is not attributed to a catalytic degradation. It will be appreciated that the first SCR device and the second SCR device may demand injections separately (e.g., first SCR device $NO_x$ output is less than the first $NO_x$ concentration threshold and second SCR device $NO_x$ output is greater than the second $NO_x$ concentration threshold) or jointly.

At any rate, if a urea injection is not desired, then the method 400 proceeds to 422 to maintain current engine operating parameters and does not inject reductant into the exhaust gas stream. If a reductant injection is desired, then the method 400 proceeds to 424 to determine urea injection conditions.

The injection conditions may include one or more of an injection pressure, injection volume, and engine operating adjustments. As an example, the injection volume may be increased based on a difference between $NO_x$ sensed downstream of an SCR device and a $NO_x$ concentration threshold. For example, as the difference between $NO_x$ output from the first SCR device and the first $NO_x$ concentration threshold increases, the injection volume and/or amount correspondingly increases. As another example, the injection pressure may be increased if the second SCR device demands an injection and the first SCR device does not or if the second SCR demands a greater amount of injection than the first SCR device. In one example, if the first SCR device is similar to the embodiment 340 of the FIG. 3C, then the increased pressure may promote reductant flow to flow-through portions of the first SCR device such that a greater amount of reductant reaches the second SCR device. The increased pressure may adjust a radial distribution of reductant to the exhaust passage, wherein a greater amount of reductant flows to outer radial regions of the exhaust passage compared to lower injection pressures. Additionally or alternatively, exhaust mass flow may be adjusted to adjust injection conditions (e.g., more exhaust mass flow may promote urea flow to the second SCR device). For example, increasing exhaust mass flow may promote reductant distribution to outer radial regions of the exhaust passage. However, exhaust mass flow and other engine operating parameters may only be adjusted in accordance with driver demand, in one example. Furthermore, engine operating parameters may be adjusted when the urea injection occurs during an engine idle.

At 426, the method 400 includes injecting reductant into the exhaust passage upstream of the first SCR device. The urea mixes with exhaust gas and decomposes into $NH_3$. The $NH_3$ and exhaust gas may flow through the first SCR device and the second SCR device, where $NH_3$ may be stored.

Thus, a method for n exhaust system comprising an exhaust passage, first and second SCR devices cascaded along the exhaust passage, the first SCR device being located upstream of the second SCR device relative to a direction of exhaust gas flow, a reductant injector located upstream of the first SCR device, and a controller storing instructions in non-transitory memory that when executed enable the controller to adjusting an injection pressure and engine operating parameters in response to a $NO_x$ concentration downstream of the first or second SCR devices being less than a threshold $NO_x$ concentration.

The first SCR device includes a first sensor for measuring a first $NO_x$ concentration, the second SCR device includes a second sensor for measuring a second $NO_x$ concentration, and where the first and second $NO_x$ concentrations are compared to first and second $NO_x$ concentration thresholds, respectively. The method including injecting based on a measured $NO_x$ value exceeding a $NO_x$ concentration threshold. The reductant injector is a urea injector positioned to inject urea into the exhaust passage upstream of the first SCR device. The first sensor extends to a central axis of the exhaust passage and measures exhaust gas directly downstream of a catalytic region of the first SCR device.

The controller further includes instructions for initiating a diagnostic routine upon completion of a threshold duration following an injection. The diagnostic routine comprises a functional on-board monitor and a threshold on-board monitor, where the functional on-board monitor is based on the first SCR device comprising a first threshold amount of catalytic activity, and where the threshold on-board monitor is based on the second SCR device comprising a second threshold amount of catalytic activity, and where the second threshold amount of catalytic activity is greater than the first amount of catalytic activity.

The first SCR device comprises flow-through regions fluidly separated from portions of the first SCR device coated with SCR washcoat, and where the second SCR device is fully coated with an SCR washcoat and does not comprise flow-through regions.

Turning now to FIG. 5, it shows an exhaust system 500 which may be used similarly to exhaust system 200. As such, components previously introduced are similarly numbered in subsequent figures. However, the exhaust system 500 may differ from the exhaust system 200 in that the exhaust system 500 utilizes the third embodiment 340 of the first SCR device 210 shown in FIG. 3C, along with a first sensor 512 and a second sensor 514 located in the outlet cone 242 adjacent the first SCR device 210.

The first sensor 512 and the second sensor 514 are located proximal to the outlet 240 of the first SCR device 210. Bores, welds, adhesives, fusions, and/or other coupling elements may be used to physically couple the first sensor 512 and the second sensor 514 to the outlet cone 242. The first sensor 512 is physically coupled to a lower portion of the exhaust passage 202. The second sensor 514 is physically coupled to an upper portion of the exhaust passage 202. Specifically, the first sensor 512 extends into the exhaust passage 202 no further than the horizontal axis 295. Meanwhile, the second sensor 514 extends into the exhaust passage 202 no further than the flow-through passage 346. As such, the first sensor 512 is located directly downstream of the catalyst zone 344 and the second sensor 514 is located directly downstream of the flow-through passage 346. As described above, the flow-through passage 346 is annular and located between the exhaust pipe of the exhaust passage 202 and the catalyst zone 344. By doing this, the second sensor 514 may measure a greater amount of reductant slip (e.g., $NH_3$ slip) than the first sensor 512. It will be appreciated that the first sensor 512 and the second sensor 514 may extend at different lengths without departing from the scope of the present disclosure. For example, the first sensor 512 may extend at a length below the horizontal axis 295 while still being directly downstream of the catalyst zone 344.

That is to say, the first sensor 512 is located directly downstream of a more catalytically dense portion of the first SCR device 210. Thus, the catalyst zone 344 comprises a greater amount of catalyst washcoat than the flow-through zone 346. As such, a greater amount of reductant may flow through the flow-through passage 346 than the catalyst zone 344. In this way, the second sensor 514 may measure a greater amount of reductant slip through the exhaust passage 202 at the first SCR device 210 than the first sensor 512. The first sensor 512 and the second sensor 514 are located along a common plane, but at different radial positions from the horizontal axis 295 (e.g., central longitudinal axis). In one example, the first sensor 512 is closer to the horizontal axis 295 than the second sensor 514.

The first 512 and second 514 are $NO_x$ sensors in one example. Additionally or alternatively, the first 512 and second 514 sensors may comprise other functions, such as, measuring temperature, mass flow rate, etc. Thus, the first 512 and second 514 sensors may perform measurements and function similar to upstream sensor 216 described above with respect to FIG. 2.

Operation of the sensors may be adjusted based on various engine and/or injection operating parameters. In one example, the first sensor is deactivated or monitors parameters outside of $NO_x$ (e.g., exhaust gas temperatures) and the second sensor senses $NO_x$ during a low-pressure injection configured to deliver reductant to the first SCR device. As such, the second sensor may monitor an amount of injection flowing to the outer region of the first SCR device 210. Thus, feedback from the second sensor may be used to adjust the injection conditions. For example, if too high an amount of reductant is sensed by the second sensor, then the injection pressure may be further decreased, or an exhaust flow may decrease.

In one example, the method described below with respect to FIG. 6 comprises flowing engine exhaust sequentially through a first and second SCR device, the first having a flow-through region with less or no catalytic coating, sensing with first and second NOx sensors at a common longitudinal passage location between the SCR devices, but at different radial positions from a central longitudinal axis of the passage, and adjusting a reductant injection pressure or amount responsive to the first and second NOx sensors. Additionally or alternatively, the first sensor is closer to the central longitudinal axis than the second sensor, and where a central region of the first SCR is coated and an outer region of the first SCR is uncoated, and where a third sensor is radially spaced away from the central longitudinal axis downstream of the second SCR device. Additionally or alternatively, during a higher injection pressure the first sensor measures $NO_x$, the second sensor measures exhaust gas temperatures, during a lower injection pressure the first sensor measures exhaust gas temperatures and the second sensor measures $NO_x$, and during a mid-injection pressure the first and second sensors measure $NO_x$. Furthermore, a third sensor measures $NO_x$ during higher injection and mid-injection pressures. Additionally or alternatively, the first, second, and third sensor activity may be further dependent on an exhaust gas flow rate.

In alternative embodiments, all of the first, second, and third sensors are continuously active during a range of engine and injector operating parameters. In one example, the sensors are used to continuously update an $NH_3$ storage model. $NH_3$ storage on the second SCR device may be estimated based on $NO_x$ and $NH_3$ concentration measured between the first and second SCR devices via the first and second sensors. The third sensor, downstream of the second SCR device may adjust the $NH_3$ storage model by measuring $NO_x$ and $NH_3$ concentrations downstream of the second SCR device. In one example, the $NH_3$ storage model may estimate the second SCR catalyst to store 50% of $NH_3$ slipping through the first SCR device and treat 95% of $NO_x$ flowing through the first SCR device. However, an actual amount of storage and treatment is measured via the third sensor, which may detect 60% $NH_3$ slip through the second SCR device (thus, only 40% of $NH_3$ slipping through the first SCR device is stored). As such, the ammonia storage model may be adjusted, whereby the ammonia storage model may request 10% less reductant be injected in a subsequent urea injection.

With respect to FIG. 4, comparisons between the first sensor 512 and the second sensor 514 may be used for performing the functional OBD monitor on the first SCR device 210. For example, if both the first 512 and second 514 sensors show similar $NO_x$ and $NH_3$ concentrations, then the first SCR device 210 may fail the functional OBD monitor, indicating the first SCR device 210 may be degraded (e.g., little to no catalytic activity).

Turning now to FIG. 6, it shows a method 600 for adjusting a reductant injection based on the exhaust system 500 of FIG. 5. As such, first SCR device 210, second SCR device 220, first sensor 512, second sensor 514, and third sensor 226 of FIG. 5 may be used in the description below. However, the method 600 may also be applied to the exhaust system 200 of FIG. 2. The reductant is urea in the example of method 600 and the urea injection may be adjusted based on first SCR device and second SCR device urea demand and current engine operating parameters, as will be described below.

The method 600 begins at 602, where the method 600 includes determining, estimating, and/or measuring current engine operating parameters. Current engine operating parameters may include one or more of engine load, engine temperature, ambient temperature, mass exhaust gas flow, mass intake air flow, urea load in a urea reservoir, a first SCR device temperature, a second SCR device temperature, and air/fuel ratio.

At 604, the method 600 includes determining if a threshold duration has elapsed. As described above, the threshold duration is based on an amount of time needed to pass following completion of a urea injection for urea to flow to the first and second sensors adjacent the first SCR device. Additionally or alternatively, a second threshold duration may be based on an amount of time needed to pass following completion of a urea injection for urea to flow to the sensor adjacent the second SCR device. As such, the second threshold duration is longer than the threshold duration. Furthermore, the first and second sensors may be activated before the sensor downstream of the second SCR device is activated. Herein, the sensor downstream of the second SCR device (e.g., sensor 226) is referred to as a third sensor. However, in the current example of the method 600, the threshold duration applies to the first, second, and third sensors. If the threshold duration has not passed, then the method proceeds to 606 to maintain current engine operating parameters and does not activate the first, second, and third sensors to measure $NO_x$ and/or $NH_3$ in exhaust gas flow.

If the threshold duration has elapsed, then the method 600 proceeds to 608 to determine if an injection is desired. As such, the first, second, and third sensors are activated and monitor if $NO_x$ is greater than a $NO_x$ concentration threshold. In one example, the step 608 may be substantially identical to the step 420 of FIG. 4, described above, wherein the first SCR device comprises a first $NO_x$ concentration threshold and the second SCR device comprises a second $NO_x$ concentration threshold. If an injection is not desired, then the method 608 proceeds to 606 and maintains current engine operating parameters and does not inject urea. In this way, the first SCR device and the second SCR device are sufficiently saturated with urea. However, if an injection is desired, then the method 600 proceeds to 610 to determine if both the first and second SCR devices desire an injection.

If both the first SCR device and the second SCR device demand a urea injection, then the method 600 proceeds to 611 to determine an injection amount. Thus, $NO_x$ measured by the first sensor exceeds the first $NO_x$ concentration threshold and $NO_x$ measured by the third sensor exceeds the second $NO_x$ concentration threshold. Differences between the measured $NO_x$ values and the respective thresholds are calculated, wherein the injection is based on the sum of the differences. This may reduce urea waste, thereby reducing vehicle operating costs.

Additionally or alternatively, the injection amount may be based on an ammonia storage model determined from feedback via the first, second, and third sensors. As described above, the ammonia storage model may track a consumption of $NH_3$ based on engine operating conditions. For example, more $NH_3$ may be consumed when engine temperatures are greater than a threshold engine temperature, where engine $NO_x$ output increases. Thus, as ammonia storage model may predict an amount of $NH_3$ stored on an SCR device by tracking $NH_3$ consumption following a previous injection. In some examples, additionally or alternatively, an injection may be initiated if the ammonia storage model determines $NH_3$ stores on an SCR device are less than a threshold store (e.g., less than 50% loaded).

At 612, the method 600 includes adjusting engine operating parameters. As described above, the urea injector is upstream of the first SCR device. As such, conditions may be altered to promote urea flow to the first and second SCR devices. In one example, an EGR flow rate may be adjusted to adjust a mass exhaust gas flow rate, thereby altering an injection pattern. As an example, decreasing the EGR flow rate increases the mass exhaust gas flow rate, resulting in decreased laminar flow. This may allow more urea to flow to the second SCR device than the first SCR device. In this way, engine operating parameters may be adjusted based on an amount of urea desired by each of the first and second SCR devices. In some examples, step 612 may be omitted from the method 600 or skipped when adjusting engine operating parameters may not be possible. For example, meeting a driver demand may supersede adjusting engine operating parameters, as will be described below.

The adjustments are in response to feedback from one or more of the first, second, and third sensors. For example, if an injection is adapted to inject to both the first and second SCR devices equally, then a difference between the injection amount and $NO_x$ sensed at the second sensor is indicative of an amount of $NH_3$ flowing toward the first SCR device. Said another way, the second sensor measures an amount of $NH_3$ flowing through bypass regions of the first SCR device toward the second SCR device and a difference between the $NH_3$ at the second sensor and the injection amount corresponds to an amount of $NH_3$ flowing to the first SCR device. If too much $NH_3$ is bypassing the first SCR device, then the injection pressure may be decreased or the injection amount may increase.

At 614, the method 600 includes injecting urea at a mid-pressure, wherein the mid pressure is greater than a lower threshold pressure and less than a higher threshold pressure. By injecting at the mid-pressure, substantially equal amounts of urea may flow to outer and central regions of an exhaust passage. Thus, urea in the central region may flow to the catalytic region of the first SCR device and be stored thereon. Urea in the outer region flows through the flow-through region of the first SCR device toward the second SCR device, where $NH_3$ is stored thereon. In one example, the mid-pressure may be a mid-pressure encompassing a lower mid-pressure and a higher mid-pressure. As such, the mid-pressure may be adjusted based on the negative counts of the first and second SCR devices. For example, if the first SCR device comprises more negative counts than the second SCR device, then the injection pressure may be adjusted to the lower mid-pressure to direct a greater amount of urea to the first SCR device. Thus, if the second SCR device comprises more negative counts than the first SCR device, then the injection pressure may be adjusted to the higher mid-pressure to direct a greater amount of urea to the second SCR device.

In some examples, additionally or alternatively, the injection amount for the first and second SCR devices may be determined based on a magnitude of $NO_x$ slip through the first and second SCR devices being greater than a threshold slip. The threshold slip is based on a maximum allowable amount of $NO_x$ to flow to the ambient atmosphere according to emissions standards. As such, as the magnitude increases (e.g., more $NO_x$ slip), then the injection amount may increase. Thus, as the magnitude decreases (e.g., less $NO_x$ slip), then the injection amount decreases.

Additionally or alternatively, during the mid-injection pressure, the first, second, and third $NO_x$ sensors are activated to provide injection feedback. For example, during the mid-injection pressure, the injection is configured to flow urea to both the first and second SCR devices. As such, if insufficient $NH_3$ slip is measured via the first sensor, which may be sensed by the first sensor measuring an increase in $NO_x$, then the injection pressure is decreased. Alternatively, if insufficient $NH_3$ slip is measured via the second and/or third sensors, which may be sensed by the second or third sensors not measuring a $NO_x$ increase similar to an expected $NO_x$ increase, then the injection pressure is increased. The expected $NO_x$ increase is based on a combination of engine operating parameters and injection conditions. Lastly, if insufficient $NH_3$ slip is measured via the first, second, and third sensors, then the injection duration and/or amount is increased.

In some embodiments, additionally or alternatively, only the first and third sensors are activated in response to the mid-injection pressure. As such, the second sensor is deactivated and feedback from the second sensor may be estimated based on feedback from the third sensor. For example, the feedback from the second sensor is estimated based on $NH_3$ slip measured by the third sensor in conjunction with an amount of $NH_3$ demanded by the second SCR device. This may provide a method for estimating $NH_3$ slip through the flow-through passage of the first SCR device. By doing this, fuel efficiency may be increased.

At 616, the method 600 includes terminating the injection. This includes disabling an actuator of the injector to no longer draw urea from a urea reservoir. Following termination of the injection, a counter may begin to measure time to determine if the threshold duration has passed.

Returning to 610, if both the first SCR device and the second SCR device do not desire an injection, then the method 600 proceeds to 618 to determine if the first SCR device desires an injection. In one example, the first SCR desires an injection if its temperature is lower than a threshold temperature and its mass of $NH_3$ is less than a threshold mass. The mass of $NH_3$ may be estimated based on $NO_x$ slip and/or $NH_3$ slip as described above. As such, the second SCR device may not desire an injection if its mass of $NH_3$ is greater than a threshold mass. The threshold temperature is based on a temperature where $NH_3$ is oxidized. As such, if the first SCR temperature is below the threshold temperature, then $NH_3$ may not be wastefully oxidized by the first SCR device.

If the first SCR device does desire an injection, then the method 600 proceeds to 619 to determine an injection amount for the first SCR device. The injection amount is based on a number of negative counts associated with the first SCR device, as described above. By doing this, the number of negative counts regarding the second SCR device is not considered when determining the injection amount for only the first SCR device. The injection amount increases as the number of negative counts increases and decreases as the number of negative counts decreases. The injection amount may alternatively be based on $NO_x$ slip through only the first SCR device, as described above at 611. The $NO_x$ slip may be calculated by calculating a difference between $NO_x$ measured by the first and second sensors. Thus, a difference between the $NO_x$ measured by the first and second sensors is substantially equal to the $NO_x$ slip. It will be appreciated that an amount of $NO_x$ measured by the first sensor is less than an amount of $NO_x$ measured by the second sensor.

At 620, the method 600 includes adjusting engine operating parameters in conjunction with driver demand. As described above, engine operating parameters are adjusted as long as a driver demand is met, in one example. Alternatively, engine operating parameters may be adjusted such that a driver demand is no longer met. This may occur to prevent future engine operating conditions falling short of meeting a driver demand. For example, if engine operating conditions are not adjusted and urea is not injected under desired conditions, then an efficiency of an SCR device may be diminished. This may result in future purposefully diminished engine power outputs to decrease emissions as a result of the improperly reduced SCR device. As such, the method may not meet a driver demand during injection conditions to prevent future driving events not meeting a driver demand and/or degradation to an SCR device.

In one example, adjustments to the engine operating parameters during injection conditions for the first SCR device may include one or more of increasing EGR flow, decreasing intake air flow, decreasing exhaust gas flow rate, advancing spark, and advancing fuel injections. As such, a mass exhaust gas flow may be decreased to promote a more laminar shaped exhaust gas flow through the exhaust passage. This may guide a urea injection toward catalytic zones (e.g., areas containing an SCR washcoat having catalytic elements) so that the first SCR device may store more urea than if no engine adjustments were made.

At 622, the method 600 includes injecting urea at the lower threshold pressure, which is based on a pressure of an injection configured to direct urea toward a center of an exhaust passage. Adjusting engine operating parameters and injection pressures may alter a flow path of 5-30% of urea entering the exhaust passage. In one example, adjusting engine operating parameters and injection pressures alters a flow path of up to 20% of urea entering the exhaust passage. As such, the lower threshold pressure is lower than the mid-pressure described above at 614. In this way, the lower threshold pressure directs a majority of urea to flow toward the central region of the exhaust passage corresponding to a catalytic region of the first SCR device. In one example, the injection pressure decreases as the exhaust gas flow rate increases to further promote laminar flow.

In one example, the injection at 622 may be longer than the injection at 614, for similar injection volumes, due to the lower injection pressure. However, a duration of injection may be equal in some examples due to the injection at 614 injecting urea for the first SCR device and the second SCR device while the injection at 622 only injects urea for the first SCR device. The method 600 proceeds to 616 to terminate the injection, as described above.

In some embodiments, during the lower injection pressure (e.g., injection pressure less than the lower threshold pressure), only the first sensor is activated. Additionally or alternatively, the second and/or third sensors are also activated. In one example, only the first sensor is activated if the injection pressure is less than the lower threshold pressure and exhaust gas mass flow rate is low. In this way, the second and third sensors are deactivated and energy is conserved. However, the second and third sensors may be activated during the lower injection pressure if exhaust mass flow rate is above a low flow rate. In this way, the lower injection pressure may be less capable of directing $NH_3$ to the central region of the exhaust passage and the second and third sensors may provide feedback regarding a deviation of the reductant injection. For example, higher exhaust mass flow rate may result in increased $NH_3$ flow to outer regions of the exhaust passage, and as a result, the second and/or third sensors may sense the increased $NH_3$ flow and feedback from the sensors may result in an increased amount and/or duration of injection.

In one example, a volume of urea to be injected is adjusted based on a difference between the $NH_3$ concentration measured directly downstream of the first SCR device by the first sensor 512 and a first threshold $NH_3$ concentration, which may be calculated based on a desired $NH_3$ concentration correlated to an amount of SCR washcoat on the first SCR device. For instance, if the amount of SCR washcoat increases, then the desired $NH_3$ concentration also increases due to the increased ability of the first SCR device to store more $NH_3$. Thus, as the difference increases (e.g., less $NH_3$ in the exhaust gas), the volume of urea injected may also increase. Additionally, the difference calculated for the first SCR device may be added to a difference calculated for the second SCR device, which may further alter the volume of urea to be injected.

Returning to 618, if the method 600 determines that the first SCR device does not desire a urea injection, then the method proceeds to 624 where the second SCR device desires a urea injection. In some examples, the first SCR device does not desire a urea injection based on one or more of a temperature of the first SCR device being greater than a threshold temperature and a $NH_3$ concentration measured downstream of the first SCR device being greater than the first threshold $NH_3$ concentration. In one example, the threshold temperature is based on a temperature of the first SCR device capable of oxidizing stored $NH_3$, thereby reducing an $NH_3$ efficiency of the first SCR device. The threshold $NH_3$ concentration is based on a concentration of $NH_3$ measured by the first sensor (e.g., first sensor 512 of FIG. 5) directly downstream of the catalytic zone of the first SCR device being too low to treat a sufficient amount of $NO_x$. As such, when the $NH_3$ concentration measured in the exhaust gas is greater than the first threshold concentration, the method 600 determines the first SCR device has a sufficient amount of $NH_3$ stored therein.

The second SCR device desires an injection when a concentration of $NH_3$ measured by the third sensor 226 of FIG. 5, outside of a urea injection, is less than a second threshold $NH_3$ concentration. In some examples, the second threshold $NH_3$ concentration is substantially equal to the first threshold $NH_3$ concentration. In other examples, the thresholds may be unequal due to differing amounts of SCR washcoat being applied to the first and second SCR devices. For example, if the first SCR device comprises 75% SCR washcoat and the second SCR device comprises 50% SCR washcoat, then the first threshold $NH_3$ concentration is greater than the second threshold $NH_3$ concentration by 25%.

At 625, the method 600 determines an injection amount for the second SCR device. This may be based on a number of negative counts for the second SCR device. Thus, the number of negative counts associated with the first SCR device is not considered. Alternatively, the injection amount may be based on $NO_x$ slip through the second SCR device. In one example, $NO_x$ slip is determined by comparing an amount of $NO_x$ measured by the second and third sensors, where a difference between the amounts of $NO_x$ measured at the sensors is substantially equal to the $NO_x$ slip. It will be appreciated that an amount of $NO_x$ measured by the third sensor is less than an amount of $NO_x$ measured by the second sensor.

At 626, the method 600 includes adjusting engine operating parameters. In one example, adjusting engine operating parameters includes one or more of decreasing EGR flow, increasing mass intake air flow, increasing a post-injection pressure (e.g., fuel injection following a first fuel injection), increasing exhaust gas flow rate, and retarding spark. As such, adjustments may increase turbulence and/or mass exhaust gas flow, resulting in decreased laminar flow and promoting exhaust flow to outer regions of the exhaust passage.

At 628, the method 600 includes injecting urea at the higher threshold pressure, which is greater than the mid-pressure and lower threshold pressure. As such, a velocity of atomized urea entering the exhaust passage is increased, further decreasing a laminar flow of the exhaust gas and urea, resulting in an increased amount of urea flowing toward outer regions of the exhaust passage away from the catalytic portion of the first SCR device. As described above, urea flow to the outer regions of the exhaust passage corresponding to flow-through passages of the first SCR device may be increased by up to 20% by increasing the injection pressure. As an example, the injection pressure increases as the exhaust gas flow rate decreases. The method 600 proceeds to 616 to terminate the injection.

In some examples, additionally or alternatively, following termination of the urea injection after the threshold duration, the method may include monitoring exhaust gas conditions. In one example, exhaust gas conditions following the urea injection may provide feedback regarding an efficacy of the previous injection. For example, if a urea injection was conditioned to be delivered to the second SCR device, then the first sensor 512, second sensor 514, and sensor 226 may monitor an ability of urea to reach the second SCR device. For example, if the first sensor 512 measures an amount of $NH_3$ within a threshold range of urea measured by the second sensor 514, then future urea injections for only the second SCR device may include further adjustments further promoting urea flow to the second SCR device. However, if the sensor 226 measures an $NH_3$ concentration greater than or equal to the second threshold $NH_3$ concentration, then the injection for only the second SCR device may be determined to be successful, and similar conditions for future injections for only the second SCR device may be used if possible.

As such, the method 600 depicts three different injection conditions configured to direct reductant to the first SCR device, the second SCR device, or a combination thereof. In one example, during a first condition where only the first SCR device demands reductant, only the first sensor is activated and the second and third sensors are deactivated. During a second condition where only the second SCR device demands reductant, only the second and third sensors are activated and the first sensor is deactivated. Lastly, during a third condition, where both the first and second SCR devices demand reductant, the first, second, and third sensors are activated.

In some embodiments, additionally or alternatively, activation and deactivation of the sensors may be dependent upon exhaust gas flow rate. For example, during higher exhaust gas flow rates greater than an upper threshold flow rate (e.g., 10 g/s), the second and third sensors are activated. As such, during a first condition with higher exhaust gas flow rates, the first, second, and third sensors are activated. Alternatively, during lower exhaust gas flow rates less than a lower threshold flow rate (e.g., 2 g/s), the first sensor is activated. As such, during a second condition with lower exhaust gas flow rates, the first, second, and third sensors are activated. In this way, the first, second, and third sensors may be activated independently of the first, second, and third conditions.

In this way, a method comprises adjusting a pressure of a reductant injector positioned upstream of a first SCR device in an exhaust passage, wherein the pressure alters a reductant distribution in the exhaust passage, responsive to an SCR temperature, wherein a second SCR device is arranged downstream of a first SCR device. The first SCR device and the second SCR device are partially coated with an SCR washcoat, wherein the first SCR device is coated along its central core. An outer region of the first SCR device does not comprise the SCR washcoat, thereby allowing exhaust gas to flow therethrough without reacting with catalytic elements. By doing this, $NH_3$ is not stored in the outer region of the first SCR device. The pressure of the reductant injector is high when the SCR temperature of the first SCR device is greater than a threshold temperature and when an $NH_3$ concentration measured downstream of the second SCR device is less than a second threshold $NH_3$ concentration. Alternatively, the pressure of the reductant injector is low when the SCR temperature of the first SCR device is less than a threshold temperature, an $NH_3$ concentration measured downstream of the first SCR device is less than a first threshold $NH_3$ concentration, and the $NH_3$ concentration downstream of the second SCR device is greater than the second threshold $NH_3$ concentration.

In an alternate embodiment, the method comprises monitoring $NH_3$ slip through first and second SCR devices, the first SCR device being located upstream of the second SCR device, calculating a difference between the $NH_3$ slip and a threshold $NH_3$ concentration for the first and second SCR devices, delivering an amount of urea to the first and second SCR devices corresponding to differences calculated, and adjusting a pressure of a urea injection corresponding to the differences calculated, where a urea injector is located upstream of the first SCR device. The urea injector is the only urea injector in an exhaust passage. The amount of urea increases as the difference increases. The pressure of the urea injection increases when the difference calculated for the second SCR device is greater than the difference calculated for the first SCR device. The first SCR device stores a greater amount of $NH_3$ than the second SCR device.

Thus, the first SCR device comprises a first sensor located downstream of the central region and a second sensor located downstream of the outer region. The first sensor is configured to measure $NH_3$ and $NO_x$ slip through the catalytic region of the first SCR device. The second sensor is configured to measure $NH_3$ and $NO_x$ flow through the outer region. The values of the first and second sensors may be compared to determine if the first SCR device is degraded based on a function OBD monitor. Alternatively, the second sensor may be omitted, and feedback from the first sensor may be used to estimate conditions of the first SCR device along with a concentration of $NO_x$ and $NH_3$ in exhaust gas flow to the second SCR device.

The second SCR device comprises a third sensor located downstream of the second SCR device. The third sensor is configured to measure $NH_3$ and $NO_x$ slip through the second SCR device. Feedback from the third sensor may be compared to feedback from the first and second sensors to determine if the second SCR device meets a threshold OBD monitor. For example, the threshold OBD monitor may be based on an estimated change in $NO_x$ concentration from upstream of the second SCR device to downstream of the second SCR device. As such, the estimated change may increase as $NO_x$ slip measured by the first and/or second sensors increases. In this way, if $NO_x$ slip measured by the third sensor is too high, then the second SCR device is not sufficiently reducing $NO_x$ and is less than the threshold OBD monitor.

Turning now to FIG. 7, it depicts an operating sequence 700 illustrating example results for an exhaust system comprising two SCR devices cascaded along an exhaust passage. In one example, the operating sequence 700 illustrates example results for exhaust system 500 of FIG. 5 operating with methods described in FIG. 6. Line 702 represents a first sensor $NO_x$ concentration, dashed line 704 represents a first $NO_x$ concentration threshold, line 706 represents a second sensor $NO_x$ concentration, line 708 represents a third sensor $NO_x$ concentration, dashed line 710 represents a second $NO_x$ concentration threshold, line 712 represents a first SCR device temperature, dashed line 714 represents a threshold temperature, line 716 represents an injection pressure, and line 718 represents an injection amount. Lines 716 and 718 are only visible when the urea injector is injecting urea. The first, second, and third sensors correspond to first sensor 512, second sensor 514, and third sensor 226 of FIG. 5, respectively. For illustrative purposes the first, second, and third sensors are shown operating both during and outside of urea injections. However, it will be appreciated that the sensors may be activated after a threshold duration following a urea injection, as described above. As such, dash lines 703, 707, and 709 have been superimposed onto the first, second, and third sensor plots, respectively, to indicate a real-time activation/deactivation of the sensors, where the sensor is only used in the method of FIG. 6 when the sensor is activated to provide NOx information based on an injection pressure, injection amount, and/or exhaust gas flow rate, as described above. Additionally or alternatively, the sensors may be continuously active to provide information regarding ammonia storage, among other things, as described above. The horizontal axes of each plot represent time and time increases from the left side of the figure to the right side of the figure.

Prior to $t_1$, an engine start is initiated, wherein the engine start is a cold-start. Thus, the engine temperature is less than an ambient temperature. As such, the first SCR temperature is below the threshold temperature at a relatively low temperature, as shown by lines 712 and 714, respectively. As the cold-start progresses, the first SCR temperature increases toward the threshold temperature due to the proximity of the first SCR device to an exhaust manifold. Although not shown, a temperature of the second SCR device does not increase as rapidly as the first SCR device since the second SCR is further from the exhaust manifold than the first SCR device. The second sensor $NO_x$ is relatively low, as shown by line 706. The second sensor $NO_x$ corresponds to an engine $NO_x$ output (e.g., a feedgas $NO_x$ concentration). Additionally, the first sensor $NO_x$ increases toward the first $NO_x$ concentration threshold, as shown by lines 702 and 704, respectively. When the first sensor $NO_x$ is greater than the first $NO_x$ threshold, then the first SCR device $NH_3$ load is less than a first threshold load and demands an injection. In this way, the first SCR device $NH_3$ load is insufficient to treat $NO_x$ to an amount less than or equal to the first sensor $NO_x$ threshold. It will be appreciated that the first sensor $NO_x$ may also measure $NH_3$ flowing through the first SCR device due to the cross referencing experienced by $NO_x$ sensors. Thus, the first sensor $NO_x$ is greater than the feedgas $NO_x$ when $NH_3$ is slipping through the first SCR device. The third sensor $NO_x$ is less than the second $NO_x$ concentration threshold, as shown by lines 708 and 710, respectively. As such, the second SCR device is sufficiently loaded with $NH_3$ and is sufficiently treating $NO_x$ emissions to an amount less than the second $NO_x$ concentration threshold. Thus, when the third sensor $NO_x$ is greater than the second $NO_x$ concentration threshold, an $NH_3$ load of the second SCR device is less than a second threshold load, and the second SCR device demands an injection. Since neither SCR device demands an injection (e.g., both $NO_x$ outputs are less than the respective $NO_x$ threshold values) the injection pressure and amount are zero and an injection is not occurring, as shown by lines 716 and 718 respectively. The first, second, and third sensors are activated (e.g., on), as shown by lines 703, 707, and 709, respectively.

At $t_1$, the first sensor $NO_x$ is greater than the first $NO_x$ concentration threshold, indicating the first SCR device $NH_3$ load is less than the first threshold load. As a result, the injection is activated, the injection pressure increases to a relatively low pressure, and the injection amount increases to an amount between high and low amounts. The second sensor $NO_x$ and third sensor $NO_x$ remain relatively constant. Specifically, the third sensor $NO_x$ remains below the second $NO_x$ concentration threshold. The first SCR temperature continues to increase toward the threshold temperature. The first, second, and third sensors are deactivated in response to the injection being activated. It will be appreciated that the first, second, and third sensor remain activated during the injection, but monitor different parameters. For example, during the injection, the sensors may monitor exhaust gas temperatures instead of $NO_x$ values.

After $t_1$ and prior to $t_2$, the urea injection continues. The injection pressure remains substantially low. The first sensor $NO_x$ decreases toward the first $NO_x$ concentration threshold, indicating $NO_x$ output from the first SCR device is decreasing. Since the injection pressure is relatively low, the second sensor $NO_x$ slightly increases despite the injection amount being between the high and low amounts. This may be due to a small amount of $NH_3$ flowing toward an outer region of the exhaust passage, while a majority of $NH_3$ flows to the central core of the first SCR device comprising the SCR washcoat. That is to say, only a small portion of the urea injection flows toward the second sensor, where the second sensor may cross-reference the injection with feedgas $NO_x$. The third sensor $NO_x$ may also slightly increase corresponding to an amount of $NH_3$ flowing by the second sensor and slipping from the first SCR device. However, this $NH_3$ may not be stored by the second SCR device and may be directed to an ambient atmosphere. However, it will be appreciated that a majority of $NH_3$ injected flows through and is stored on the catalytic portion of the first SCR device. The temperature of the first SCR device continues to increase as the engine operating temperature increases. In one example, the engine load may be increasing toward a high engine load. In this way, operating sequence 700 may plot conditions from an engine start to an engine operating at higher engine loads. The first, second, and third sensors are deactivated.

At $t_2$, the first sensor $NO_x$ is less than the first $NO_x$ concentration threshold, indicating a first SCR device $NH_3$ load is greater than the first threshold (e.g., 95% loaded). Thus, the first SCR device is saturated with $NH_3$ and may sufficiently treat $NO_x$. In response, the urea injection is terminated, the injection amount decreases to 0, and the injection pressure decreases to zero. Thus, the second sensor $NO_x$ decreases toward a feedgas $NO_x$ amount. The third sensor $NO_x$ begins to increase toward the second $NO_x$ concentration threshold as its $NH_3$ load is consumed. The first, second, and third sensors are deactivated.

After $t_2$ and prior to $t_3$, the first sensor $NO_x$ remains substantially constant below the first $NO_x$ concentration threshold. The second sensor $NO_x$ decreases and is substantially equal to the feedgas $NO_x$ concentration as $NH_3$ is cleared from the exhaust gas. As described above, the threshold duration corresponds to a duration of time needed to flush the exhaust gas of $NH_3$. In one example, the threshold duration is graphically represented by a distance between line $t_2$ and line 703, line 705, or line 707. As shown, the threshold duration is substantially equal for each of the first, second, and third sensors. In this way, when the first, second, and third sensors are activated, the second sensor $NO_x$ is substantially equal to feedgas $NO_x$, and $NH_3$ is no longer cross-referenced at the second sensor. The third sensor $NH_3$ increases toward the second $NO_x$ concentration threshold. The first SCR temperature continues to increase toward the threshold temperature. The urea injection remains deactivated.

At $t_3$, the third sensor $NO_x$ concentration is greater than the second $NO_x$ concentration threshold indicating an injection demand of the second SCR device. As such, the second SCR device $NH_3$ load is less than a second threshold and $NO_x$ output from the second SCR device is greater than a desired amount. The injection amount is between the high and low amounts, similar to the injection between $t_1$ and $t_2$. However, the injection pressure is relatively high, thereby allowing the injection to be radially distributed to outer radial zones of the exhaust passage. Said another way, a high urea velocity may promote urea flow to outer regions of the exhaust passage corresponding to flow-through regions of the first SCR device. As such, the first sensor $NO_x$ remains substantially constant and the second sensor $NO_x$ begins to increase. Thus, the second sensor feedback includes a sum of the feedgas NO and $NH_3$ from the injection being measured as $NO_x$. Although the injection amounts for the first and second SCR devices are shown being substantially equal, it will be appreciated that injection amounts for the second SCR device may be greater than injection amounts for the first SCR device due to the second SCR device comprising more SCR coating than the first SCR device. The first SCR device temperature continues to increase above the threshold temperature. The first, second, and third sensors are deactivated.

In one example, during $t_3$, an injection may not be provided to the first SCR device since its temperature is greater than the threshold temperature. That is to say, if the first SCR device demands an injection when its temperature is greater than the threshold temperature, then an injection may not be activated or adjusted to direct $NH_3$ to the first SCR device. This is due to the first SCR device being too hot, which may result in the $NH_3$ oxidizing.

After $t_3$ and prior to $t_4$, the injection pressure remains high and as a result, the second sensor NO increases toward a relatively high amount and the third sensor NO decreases toward the second NO concentration threshold. The first sensor NO remains substantially constant due to a majority of urea flowing to outer regions of the exhaust passage compared to a central region corresponding to a catalytic zone of the first SCR device. In some examples, the first sensor NO may slightly increase as a small amount of reductant flows toward the central region of the exhaust passage. In this way, the injection corresponds to an injection for only the second SCR device and the injection amount remains between the high and low amounts. The first SCR temperature remains substantially constant. In some examples, the injection may slightly decrease a temperature of the first SCR device. The first, second, and third sensors are deactivated.

At $t_4$, the injection is terminated, the injection amount decreases to zero, and the injection pressure decreases to zero in response to the third sensor NO being slightly lower than the second NO concentration threshold. Thus, the second SCR device is sufficiently treating $NO_x$ and its $NH_3$ load is greater than the second threshold. The first sensor NO remains substantially constant and below the first NO concentration threshold. The first SCR temperature remains substantially constant. The first, second, and third sensors are deactivated.

After $t_4$ and prior to $t_5$, the second sensor NO decreases toward a feedgas $NO_x$ concentration. The third sensor NO decreases to an amount less than the second $NO_x$ concentration threshold. The first sensor NO remains substantially constant. As a result, the first and second SCR devices are sufficiently saturated with $NH_3$ and do not demand injections. The first SCR device temperature remains substantially constant and the injector remains deactivated, resulting in the injection pressure and amount remaining at zero. The first, second, and third sensors are activated following the threshold duration.

At $t_5$, the second sensor NO remains substantially constant since the injector is off. The first sensor NO and the third sensor NO begin to increase toward the first and second $NO_x$ concentration threshold, respectively, as $NH_3$ is consumed due to treating $NO_x$. Furthermore, the first SCR temperature begins to decrease toward the threshold temperature. The injection pressure and amount remain at zero. The first, second, and third sensors remain active.

After $t_5$ and prior to $t_6$, the first and third sensor NO measurements continue to increase. The first SCR temperature continues to decrease toward the threshold temperature. The second sensor NO remains substantially constant. The injection remains deactivated. The injection pressure and amount remain at zero. The first, second, and third sensors remain active.

At $t_6$, the first sensor NO is greater than the first NO concentration threshold and the third sensor NO is greater than the second NO concentration threshold. The second sensor $NO_x$ is substantially constant. Additionally, the first SCR temperature is substantially equal to the threshold temperature. As a result, the injector is initiated and the injection pressure is a mid-pressure between the high and low pressures. By doing this, engine operating parameters and the injection pressure are adjusted to disperse an injection to outer and central regions of the exhaust passage substantially equally. The injection amount is increased to a relatively high amount in response to both devices demanding an injection. In one example, the high amount is twice as much as the amount between the high and low amounts, shown between $t_1$ and $t_2$ and $t_3$ and $t_4$. The first, second, and third sensors are deactivated.

After $t_6$ and prior to $t_7$, the first and third sensor $NO_x$ concentrations increase toward the first and second SCR device efficiencies, respectively, as urea flows to the first and second SCR devices. The second sensor $NO_x$ increases toward an amount between relatively high and low. However, a concentration of $NO_x$ detected between $t_6$ and $t_7$ by the second sensor is less than the amount detected between $t_3$ and $t_4$. This is due to the injection being adapted to flow to both the first and second SCR devices, whereas the injection between $t_3$ and $t_4$ is adapted to flow mainly to the second SCR device. The first SCR temperature continues to decrease and is less than the threshold temperature. The injection pressure remains at a mid-pressure and the injection amount remains relatively high. The first, second, and third sensors are deactivated.

In some examples, the injection pressure may be adjusted during the injection based on feedback from one or more of the first, second, and third sensors. For example, the first SCR device may demand more urea than the second SCR device if a difference between the first sensor $NO_x$ and the first SCR as $NH_3$ is consumed due to treating $NO_x$ is greater than a difference between the third sensor $NO_x$ and the second SCR as $NH_3$ is consumed due to treating $NO_x$. Alternatively, the second sensor $NO_x$ may provide an indication of an injection dispersion in the exhaust passage, wherein the injection parameters may be adjusted to meet a desired injection dispersion.

At $t_7$, the first and third sensor $NO_x$ are less than the first and second $NO_x$ concentration threshold, respectively. As such, the injection is terminated, the injection amount decreases to zero, and the injection pressure decreases to zero. The second sensor $NO_x$ remains between the high and low levels. The first SCR temperature continues to decrease. The first, second, and third sensors are deactivated.

After $t_7$, the first sensor $NO_x$ decreases below the first $NO_x$ concentration threshold. Likewise, the third sensor $NO_x$ decreases below the second $NO_x$ concentration threshold. The second sensor $NO_x$ decreases toward the feedgas $NO_x$ and is substantially equal to the feedgas $NO_x$ following the threshold duration. The injection remains deactivated, the injection amount remains at zero, and the injection pressure remains at zero. The first, second, and third sensors are activated following the threshold duration. As shown, the threshold duration following $t_7$ is longer than the threshold duration following $t_2$ and $t_4$. This may be due to the injection amount between $t_6$ and $t_7$ being greater than the injection amount in the previous injections. Additionally or alternatively, the threshold duration may be adjusted based on one or more of mass exhaust flow, EGR flow rate, etc. In some example, the threshold duration is a fixed duration of time.

Turning now to FIG. 8, it depicts an operating sequence 800 illustrating example results for an exhaust system comprising two SCR devices cascaded along an exhaust passage. In one example, the operating sequence 800 illustrates example results for exhaust system 500 of FIG. 5 operating with methods described in FIG. 4. Specifically, the operating sequence 800 graphically shows a diagnostic routine including the functional OBD monitor and the threshold OBD monitor described in FIG. 4. Plot 810 represents an injector activity, line 820 represents a first sensor $NO_x$ measurement, line 822 represents a feedgas $NO_x$ concentration, line 830 represents a third sensor $NO_x$ measurement, line 832 represents a threshold $NO_x$ output, line 840 represents an indicator lamp activity, and line 850 represents if a diagnostic is running. The diagnostic may include the functional OBD monitor for the first SCR device and the threshold OBD monitor for the second SCR device. The horizontal axes of each plot represent time and time increases from the left side of the figure to the right side of the figure.

Prior to $t_1$, the injector is on (shown by line 810) and injection conditions are modified to direct a greater amount of urea toward the first SCR device than the second SCR device. As such, the first sensor $NO_x$ (shown by line 820) increases beyond the feedgas $NO_x$ as $NO_x$ and $NH_3$ are sensed by the first sensor. The third sensor $NO_x$ (shown by line 830) also increases, however, by a lower amount. This may be due to a majority of $NH_3$ from the injection being stored on the first SCR device. The indicator lamp is off (shown by line 840) and the diagnostic is not running (shown by line 850). As described above, the diagnostic may not be activated during injection due to cross referencing at the first and third sensors.

At $t_1$, the injection is deactivated. As described above, an injection for the first SCR device is deactivated in response to the first SCR device $NH_3$ load becoming greater than or equal to a first threshold load. This is determined by measuring a $NO_x$ output from the first SCR device being less than a first $NO_x$ concentration threshold. The first and third sensor $NO_x$ values begin to decrease. The indicator lamp remains off and the diagnostic is inactive.

After $t_1$ and prior to $t_2$, the injection is off and the first sensor $NO_x$ decreases to a relatively low amount. The third sensor $NO_x$ remains relatively low. The diagnostic is not activated since the threshold duration has not elapsed. The threshold duration is depicted by double headed arrow 802 located between $t_1$ and $t_2$. The indicator lamp is off.

At $t_2$, the diagnostic is initiated and both the functional OBD monitor and the threshold OBD monitor are performed simultaneously. The first sensor and third sensor $NO_x$ values are relatively low. The indicator lamp is off.

After $t_2$ and prior to $t_3$, the first sensor $NO_x$ is compared to the functional OBD monitor. In one example, the functional OBD monitor is substantially equal to the feedgas $NO_x$ (shown by line 822). The first SCR device fails the functional OBD monitor if the first sensor $NO_x$ is substantially equal to the feedgas $NO_x$. As shown, the first sensor $NO_x$ is less than the feedgas $NO_x$ and the first SCR device passes the functional OBD monitor, indicating the first SCR device is catalytically active. Additionally, the third sensor $NO_x$ is compared to the threshold OBD monitor. In one example, the threshold OBD monitor is substantially equal to a percentage of the first sensor $NO_x$. The percentage is 20%, in one example. Thus, if the second SCR device treats less than 80% of $NO_x$ flowing into the second SCR device, then the second SCR device fails the threshold OBD monitor. As shown, the third sensor $NO_x$ is less than the threshold OBD monitor (shown by line 832) and the second SCR device passes the threshold OBD monitor. Thus, the indicator lamp remains off and neither the first nor second SCR devices are degraded. The injection remains off.

At $t_3$, the diagnostic is deactivated. The first and third sensor $NO_x$ values increase as $NH_3$ stores on the first and second SCR devices decrease. The injector is activated in response to the second SCR device demanding an injection. The injector lamp is off.

After $t_3$ and prior to $t_4$, the injection continues to inject reductant under injection conditions configured to flow a majority of the injection to the second SCR device. As such, the third sensor $NO_x$ increases beyond the functional OBD monitor due to the third sensor measuring $NO_x$ and $NH_3$. The first sensor $NO_x$ slightly increases during the injection. However, the first sensor $NO_x$ does not increase as much as the third sensor $NO_x$ since a majority of $NH_3$ flows to the second SCR device. The indicator lamp remains off.

At $t_4$, the injector is deactivated and a threshold duration is initiated (shown by double headed arrow 804). The first sensor $NO_x$ and third sensor $NO_x$ begin to decrease. The diagnostic remains off and the indicator lamp is off.

After $t_4$ and prior to $t_5$, the threshold duration continues. The threshold duration following the injection for the second SCR device is longer than the threshold duration following the injection for the first SCR device. This is due to a greater amount of reductant being injected into the exhaust gas passage for the second SCR device compared to the first SCR device. More reductant is injected since the second SCR device is larger than the first SCR device and is fully coated, and thus, able to store more $NH_3$. The first and third sensor $NO_x$ values decrease during the threshold duration as the concentration of $NH_3$ in the exhaust gas decreases. The indicator lamp is off and the diagnostic is deactivated.

At $t_5$, the threshold duration is complete and the diagnostic is activated. The first and third sensor $NO_x$ values no longer decrease and are substantially equal to a concentration of $NO_x$ in the exhaust gas flow. The indicator lamp and the injection remain deactivated.

After $t_5$ and prior to $t_6$, the diagnostic continues and the first sensor $NO_x$ is compared to the functional OBD monitor. The first sensor $NO_x$ is less than the functional OBD monitor and the first SCR device passes the functional OBD monitor. Thus, the first sensor $NO_x$ comprises a first threshold amount of catalytic activity. The third sensor $NO_x$ is compared to the threshold OBD monitor. The third sensor $NO_x$ exceeds the threshold OBD monitor, resulting in the second SCR device failing the threshold OBD monitor. As such, the second SCR device comprises less than a second threshold amount of catalytic activity. In one example, the second SCR device is unable to store a sufficient amount of $NH_3$. In this way, the second SCR device expels an amount of $NO_x$ greater than the threshold OBD monitor.

At $t_6$, the indicator lamp is activated, notifying a vehicle operator that maintenance is desired. In some examples, additionally or alternatively, engine operating conditions are adjusted to mitigate $NO_x$ output. In one example, the adjustments include increasing EGR flow and increasing in-cylinder water injections. The diagnostic is deactivated. The injection remains deactivated. The first and third sensor $NO_x$ values continue to increase.

After $t_6$, the indicator lamp remains active until the second SCR device passes the threshold OBD monitor. The first and third $NO_x$ values continue to increase. The injection is off and the diagnostic is off.

In this way, a first SCR device is located upstream of a second SCR device in an exhaust passage with no other bypass passages and/or valves located therebetween. A reductant injector is located upstream of the first SCR device and positioned to inject reductant upstream of the first SCR device. A pressure of an injection may be adjusted based on a coating of the first SCR device. The pressure is further adjusted based on reductant demand of the first and second SCR devices, where the reductant demand is determined based on feedback from sensors located directly downstream of the first and second SCR devices. In one example, first and second sensors are located downstream of the first SCR device and a third sensor is located downstream of the second SCR device. The technical effect of placing two sensors directly downstream of the first SCR device is to measure exhaust gas directly downstream of a catalytic region of the first SCR device via the first sensor and to measure exhaust gas directly downstream of a flow-through region of the second SCR device. The sensors may provide feedback regarding reductant flow through the first and second SCR devices.

A method for treating exhaust gases comprising adjusting a pressure of a reductant injector positioned upstream of a first SCR device in an exhaust passage, wherein the pressure alters a reductant distribution in the exhaust passage, responsive to an SCR temperature, wherein a second SCR device is arranged downstream of a first SCR device. A first example of the method further includes where the adjusting is further in response to engine operating parameters, $NO_x$ slip, and SCR device temperature. A second example of the method, optionally including the first example, further includes where the pressure of the reductant injector is high when the SCR temperature of the first SCR device is greater than a threshold SCR temperature. A third example of the method, optionally including the first and/or second examples, further includes where the first SCR device comprises a plurality of catalyst regions coated with an SCR washcoat comprising catalytic elements configured to store reductant. A fourth example of the method, optionally including one or more of the first through third examples, further includes where the first SCR device comprises at least one flow-through region without an SCR washcoat and where reductant flows readily therethrough. A fifth example of the method, optionally including one or more of the first through fourth examples, further includes where the first SCR device further comprises a first sensor monitoring exhaust gas exiting a center of the first SCR device and a second sensor monitoring exhaust gas exiting an outer region of the first SCR device corresponding to the flow-through region. A sixth example of the method, optionally including one or more of the first through fifth examples, further includes where the second SCR device is fully coated with an SCR washcoat, and where the second SCR device is larger than the first SCR device.

An exhaust system comprising an exhaust passage, first and second SCR devices cascaded along the exhaust passage, the first SCR device being located upstream of the second SCR device relative to a direction of exhaust gas flow, a reductant injector located upstream of the first SCR device, and a controller storing instructions in non-transitory memory that when executed enable the controller to adjusting an injection pressure and engine operating parameters in response to a $NO_x$ concentration downstream of the first or second SCR devices being less than a threshold $NO_x$ concentration. A first example of the exhaust system further includes where the first SCR device includes a first sensor for measuring a first $NO_x$ concentration, the second SCR device includes a second sensor for measuring a second $NO_x$ concentration, and where the first and second $NO_x$ concentrations are compared to first and second $NO_x$ concentration thresholds, respectively. A second example of the exhaust system, optionally including the first example, further includes where the first sensor extends to a central axis of the exhaust passage and measures exhaust gas directly downstream of a catalytic region of the first SCR device. A third example of the exhaust system, optionally including the first and/or second examples, further includes where the controller further including instructions for initiating a diagnostic routine upon completion of a threshold duration following an injection. A fourth example of the exhaust system, optionally including one or more of the first through third examples, further includes where the diagnostic routine comprises a functional on-board monitor and a threshold on-board monitor, where the functional on-board monitor is based on the first SCR device comprising a first threshold amount of catalytic activity, and where the threshold on-board monitor is based on the second SCR device comprising a second threshold amount of catalytic activity, and where the second threshold amount of catalytic activity is greater than the first amount of catalytic activity. A fifth example of the exhaust system, optionally including one or more of the first through fourth examples, further includes where the first SCR device comprises flow-through regions fluidly separated from portions of the first SCR device coated with SCR washcoat, and where the second SCR device is fully coated with an SCR washcoat and does not comprise flow-through regions. A sixth example of the exhaust system, optionally including one or more of the first through fifth examples, further includes where the reductant injector is a urea injector positioned to inject urea into the exhaust passage upstream of the first SCR device. A seventh example of the exhaust system, optionally including one or more of the first through sixth examples, further includes where the first SCR device is located adjacent an exhaust manifold.

A method, comprising flowing engine exhaust sequentially through a first and second SCR device, the first having a flow-through region with less catalytic coating, sensing with first and second NOx sensors at a common longitudinal passage location between the SCR devices, but at different radial positions from a central longitudinal axis of the passage, and adjusting a reductant injection pressure or amount responsive to the first and second NOx sensors. A first example of the method further includes where the first sensor is closer to the central longitudinal axis than the second sensor, and where a central region of the first SCR is coated and an outer region of the first SCR is uncoated, and where a third sensor is radially spaced away from the central longitudinal axis downstream of the second SCR device. A second example of the method, optionally including the first example, further includes where the first sensor and second sensor are adjusted based on engine and injection operating parameters, where the first and second sensors switch between monitoring $NO_x$ or exhaust temperatures. A third example of the method, optionally including the first and/or second examples, further includes where during a higher injection pressure the first sensor measures $NO_x$ and the second sensor measures exhaust temperatures, during a lower injection pressure the first sensor measures temperatures and the second sensor measures $NO_x$, and during a mid-injection pressure the first and second sensors measure $NO_x$. A fourth example of the method, optionally including one or more of the first through third examples, further includes where comprising a third sensor downstream of the second SCR device, the third sensor being configured to monitor $NO_x$ and exhaust temperatures.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for treating exhaust gases comprising:
adjusting an actuator of a reductant injector to adjust a pressure of the reductant injector positioned upstream of a first SCR device in an exhaust passage, wherein the pressure alters a reductant distribution in the exhaust passage, responsive to a sensed SCR temperature, wherein a second SCR device is arranged downstream of a first SCR device, and where the first SCR device comprises at least one flow-through region without an SCR washcoat and where reductant flows readily therethrough.

2. The method of claim 1, wherein the adjusting is further in response to engine operating parameters, $NO_x$ slip, and a second SCR device temperature.

3. The method of claim 1, wherein the pressure of the reductant injector is high when the sensed SCR temperature of the first SCR device is greater than a threshold SCR temperature.

4. The method of claim 1, wherein the first SCR device comprises a plurality of catalyst regions coated with an SCR washcoat comprising catalytic elements configured to store reductant.

5. The method of claim 1, wherein the first SCR device further comprises a first sensor monitoring exhaust gas exiting a center of the first SCR device and a second sensor monitoring exhaust gas exiting an outer region of the first SCR device corresponding to the flow-through region.

6. The method of claim 1, wherein the second SCR device is fully coated with an SCR washcoat, and where the second SCR device is larger than the first SCR device.

7. An exhaust system comprising:
an exhaust passage;
first and second SCR devices cascaded along the exhaust passage, the first SCR device being located upstream of the second SCR device relative to a direction of exhaust gas flow, wherein the first SCR device comprises flow-through regions fluidly separated from portions of the first SCR device coated with an SCR washcoat, and where the second SCR device is fully coated with an SCR washcoat and does not comprise flow-through regions;
a reductant injector located upstream of the first SCR device; and
a controller storing instructions in non-transitory memory that, when executed, enable the controller to:
adjust an injection pressure and engine operating parameters in response to a $NO_x$ concentration downstream of the first or second SCR devices being less than a threshold $NO_x$ concentration.

8. The exhaust system of claim 7, wherein the first SCR device includes a first sensor for measuring a first $NO_x$ concentration, the second SCR device includes a second sensor for measuring a second $NO_x$ concentration, and where the first and second $NO_x$ concentrations are compared to first and second $NO_x$ concentration thresholds, respectively.

9. The exhaust system of claim 8, wherein the first sensor extends to a central axis of the exhaust passage and measures exhaust gas directly downstream of a catalytic region of the first SCR device.

10. The exhaust system of claim 7, wherein the controller further including instructions for initiating a diagnostic routine upon completion of a threshold duration following an injection.

11. The exhaust system of claim 10, wherein the diagnostic routine comprises a functional on-board monitor and a threshold on-board monitor, where the functional on-board monitor is based on the first SCR device comprising a first threshold amount of catalytic activity, and where the threshold on-board monitor is based on the second SCR device comprising a second threshold amount of catalytic activity, and where the second threshold amount of catalytic activity is greater than the first threshold amount of catalytic activity.

12. The exhaust system of claim 7, wherein the reductant injector is a urea injector positioned to inject urea into the exhaust passage upstream of the first SCR device.

13. The exhaust system of claim 7, wherein the first SCR device is located adjacent an exhaust manifold.

14. A method, comprising:
flowing engine exhaust sequentially through a first and a second SCR device, the first SCR device having a flow-through region with less catalytic coating;
sensing a concentration of NOx with first and second NOx sensors at a common longitudinal passage location between the SCR devices, but at different radial positions from a central longitudinal axis of the passage; and
adjusting an actuator of a reductant injector to adjust a reductant injection pressure or amount responsive to the concentration of NOx sensed via the first and second NOx sensors, wherein the first NOx sensor extends to the central longitudinal axis of the passage and measures exhaust gas directly downstream of a catalytic region of the first SCR device.

15. The method of claim 14, wherein the first sensor is closer to the central longitudinal axis than the second sensor, and where a central region of the first SCR device is coated and an outer region of the first SCR device is uncoated, and where a third sensor is radially spaced away from the central longitudinal axis downstream of the second SCR device.

16. The method of claim 14, wherein the first sensor and the second sensor are adjusted based on engine and injection operating parameters, where the first and second sensors switch between monitoring $NO_x$ or exhaust temperatures.

17. The method of claim 14, further comprising, during a higher injection pressure, the first sensor measures $NO_x$ and the second sensor measures exhaust temperatures; during a lower injection pressure, the first sensor measures temperatures and the second sensor measures $NO_x$; and, during a mid-injection pressure, the first and second sensors measure $NO_x$.

18. The method of claim 17, wherein the third sensor is configured to monitor $NO_x$ and exhaust temperatures.

* * * * *